(12) United States Patent
Awadh

(10) Patent No.: US 11,345,615 B2
(45) Date of Patent: May 31, 2022

(54) ACTIVATED CARBON-IRON/CERIUM OXIDE NANOCOMPOSITE SUITABLE FOR DYE REMOVAL

(71) Applicant: KING FAHD UNIVERSITY OF PETROLEUM AND MINERALS, Dhahran (SA)

(72) Inventor: Tawfik Abdo Saleh Awadh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 334 days.

(21) Appl. No.: 16/682,672

(22) Filed: Nov. 13, 2019

(65) Prior Publication Data

US 2021/0139348 A1    May 13, 2021

(51) Int. Cl.
  *C02F 1/28* (2006.01)
  *B01J 20/06* (2006.01)
  (Continued)

(52) U.S. Cl.
  CPC .............. *C02F 1/288* (2013.01); *B01J 20/06* (2013.01); *B01J 20/205* (2013.01);
  (Continued)

(58) Field of Classification Search
  None
  See application file for complete search history.

(56) References Cited

U.S. PATENT DOCUMENTS 8,119,555 B2    2/2012    Banerjee et al.
9,355,765 B2 *  5/2016    Xia ........................... B01J 2/00
(Continued)

FOREIGN PATENT DOCUMENTS

CN    107790139 A    3/2018
CN    108993505 A    12/2018
(Continued)

OTHER PUBLICATIONS

"Carbon Nanocomposites: Preparation and Its Application in Catalytic Organic Transformations", DOI: 10.5772/intechopen.81109, (2018) (Year: 2018).*
(Continued)

*Primary Examiner* — Chester T Barry
(74) *Attorney, Agent, or Firm* — Oblon, McClelland, Maier & Neustadt, L.L.P.

(57) ABSTRACT

Activated carbon, e.g., from waste tires, modified by bimetallic Fe and Ce nanoparticles can provide high surface area and active sites for enhanced dye adsorption. Such nanocomposites can offer magnetic removal from aqueous solutions containing, e.g., Methylene Blue or Rhodamine B. Adsorption equilibrium data fit well to the Langmuir isotherm model, with an adsorption capacity was 324.6 mg/g. Rhodamine B adsorption by such activated carbon-Fe—Ce magnetic adsorbents has an endothermic character and pseudo-second-order kinetics. In ethanol solution, rhodamine B was desorbed at high efficiency and such materials, which could be recycled up to 5 cycles. Such magnetic nanocomposites are adsorbents for treating dyes such as rhodamine B in wastewater, even in large scale adsorption systems. Polyamides can be grafted to such nanocomposites.

20 Claims, 20 Drawing Sheets

(51) Int. Cl.
*B01J 20/32* (2006.01)
*B01J 20/30* (2006.01)
*B01J 20/28* (2006.01)
*B01J 20/20* (2006.01)
*C02F 101/30* (2006.01)

(52) U.S. Cl.
CPC ... *B01J 20/28061* (2013.01); *B01J 20/28073* (2013.01); *B01J 20/28083* (2013.01); *B01J 20/3078* (2013.01); *B01J 20/324* (2013.01); *B01J 20/3212* (2013.01); *B01J 20/3217* (2013.01); *B01J 20/3236* (2013.01); *C02F 1/281* (2013.01); *C02F 1/283* (2013.01); *C02F 2101/308* (2013.01); *C02F 2305/08* (2013.01)

(56) References Cited

U.S. PATENT DOCUMENTS

| | | | | |
|---|---|---|---|---|
| 9,452,458 | B2 * | 9/2016 | Sabbah | B09C 1/10 |
| 9,844,222 | B2 * | 12/2017 | Verma | A01N 59/20 |
| 2013/0281646 | A1 * | 10/2013 | Korzekwa | A61K 47/38 536/112 |
| 2014/0187413 | A1 | 7/2014 | Lagaron Cabello et al. | |
| 2019/0070581 | A1 * | 3/2019 | Saleh | B01J 20/28059 |

FOREIGN PATENT DOCUMENTS

| CN | 108993510 A | 12/2018 | | |
|---|---|---|---|---|
| EP | 2 632 576 B1 | 10/2014 | | |
| GB | 1276141 A | * 6/1972 | | C08G 18/3212 |
| WO | WO 2013/169803 A1 | 11/2013 | | |

OTHER PUBLICATIONS

Song Cheng, et al., "Comparison of activated carbon and iron/cerium modified activated carbon to remove methylene blue from wastewater", Journal of Environmental Sciences, vol. 65, 2018, pp. 92-102.

Sohaib Imam, et al., "Studies on Activated Carbon Produced from Waste Tires", IOSR Journal of Applied Chemistry (IOSR-JAC), vol. 11, Issue 6, Ver. 1, Jun. 2018, pp. 71-74.

Khalid R. Alhooshani, "Adsorption of chlorinated organic compounds from water with cerium oxide-activated carbon composite", Arabian Journal of Chemistry, 2015, 12 pages.

S. R. Wicks, et al., "The use of polyamide coatings for selective adsorption control on activated charcoal", Journal of Biomedical Materials Research, vol. 14, 1980, pp. 743-751.

Mehdi Hatami, "Production of polyimide ceria nanocomposites by development of molecular hook technology in nano-sonochemistry", Ultrasonics Sonochemistry, vol. 44, Jun. 2018, pp. 261-271 (Abstract only).

Jakub Wiener, et al., "Sorption Process Using Polyamide Nanofibres to Remove Dye From Simulated Wastewater", NANOCON, BRNO, Oct. 23-25, 2012, 5 pages.

Mustafa Tuzen, et al., "Response surface optimization, kinetic and thermodynamic studies for effective removal of rhodamine B by magnetic AC/$CeO_2$ nanocomposite", Journal of Environmental Management, vol. 206, Jan. 15, 2018, pp. 170-177 (Abstract only).

* cited by examiner

ACTIVATED CARBON-IRON/CERIUM OXIDE NANOCOMPOSITE SUITABLE FOR DYE REMOVAL

BACKGROUND OF THE INVENTION

Field of the Invention

The present disclosure relates to activated carbon-metal oxide compositions, particularly on nanometer structural scale, and/or particularly containing iron and/or cerium oxides, as well as to methods of remediating water, e.g., by removing organic compounds from the water, such as dyes, and to methods of making such (nano)composites.

Description of the Related Art

Synthetic dyes are commonly used in the textile, plastic, and cosmetic industries, among others. Some dyes have been reported to be toxic, non-biodegradable, and/or mutagenic in nature, affecting human, animal, and/or environmental health either directly or indirectly. Synthetic dyes are significant contributors to water pollution. Rhodamine B (sometimes referred to as "RhB") is a known water-soluble dye, which is used in the textile industry. Rhodamine B has been reported to be carcinogenic, making it important to remove Rhodamine B and similar compounds from waste water samples. Several treatment methods, including adsorption, photocatalytic degradation, flotation, etc., have been used to remove Rhodamine B from water samples. Among these, adsorption has been most extensively employed for the purification of dyes from industrial wastewaters. Various adsorbents, such as activated carbon, biosorbents, kaolinite, polymeric materials, and composite materials, have been used for dye removal. Typical known adsorbents have a low (adsorption) capacity for the sorption of dyes.

In recent years, magnetic adsorbents have become popular for the sorption of dyes, because of their ease of operation and their fast and high adsorption capacity. The separation of dyes from aqueous solutions is generally more effective using an external magnetic field instead of filtration and centrifugation.

Metal organic frameworks have been reported for the removal of Rhodamine B from aqueous solutions. Magnetic montmorillonite has been reported for the sorption of Rhodamine B and hexavalent chromium. A model for the removal of Rhodamine B from water samples by using magnetic nanocomposites has been proposed. Ferromagnetic $BiFeO_3$ adsorbent has been used for the sorption of Rhodamine B. Activated carbon-Fe—Ce magnetic nanocomposite as a sorbent for the removal of particular types of dyes has not yet been reported in the art, though a number of references warrant comment.

WO 2013/169803 A1 by Mennell et al. (Mennell) discloses biogenic activated carbon compositions comprising at least 55 wt. % carbon, some of which may be present as graphene, having high surface areas and iodine numbers greater than 2000. Mennell's activated carbon may be magnetic, and may be made by mechanically and countercurrently contacting a feedstock with a vapor stream of an activation agent including water and/or $CO_2$; removing vapor and recycling at least some of the vapor to the reaction zone inlet(s) and/or feedstock; and recovering solids from the reaction zone(s) as biogenic activated carbon. Mennell may use additives, such as Mg, Mn, Al, Ni, Fe, Cr, Si, B, Ce, Mo, P, W, Va, $FeCl_3$, $FeBr_3$, MgO, dolomite, dolomitic lime, fluorite, fluorospar, bentonite, CaO, lime, NaOH, KOH, HBr, HCl, $Na_4SiO_4$, $KMnO_4$, organic acids, iodine, and/or iodine compound(s). Mennell's composition can be included in a coating. Mennell does not clearly specify a host or substrate for its material, nor use a waste-originated activated carbon.

U.S. Pat. No. 8,119,555 to Banerjee et al. (Banerjee) discloses a method of increasing the mesopore volume of a porous activated carbon, comprising coating a porous activated carbon with a metal oxide or metal oxide precursor to form a treated activated carbon; and calcining the treated activated carbon, in a dry atmosphere, to increase the mesopore volume of the treated activated carbon. Banerjee's material has a total mesopore volume of 0.10 to 0.25 $cm^3/g$, and a percentage of mesopore volume per total pore volume of 15 to 35%, and can be incorporated in cigarette filters and smoking articles. Banerjee's activated carbon may be treated with a metal oxide selected from alkali metals, alkaline earth metals, transition metals in Groups IIIB, IIB, VB, VIB, VIIB, VIIIB, IB, and IIB, Group IIIA elements, Group IVA elements, lanthanides, and actinides, e.g., cerium oxide. Banerjee does not disclose both iron and cerium oxides, nor a particular host material.

CN 107790139 A by Sun et al. (Sun) discloses the preparation of a ferrocerium heterogeneous composite activated carbon fiber, e.g., for photocatalysts. Sun uses waste cotton fabric as a carbon source and a fiber template and loading a ferrocerium heterogeneous material. Sun's photosensitive material is conducive to photocatalysis and degradation and decoloration of dye. Sun's method involves preparing short cotton fibers from cotton fabric waste, adding the fibers into a gel of cerium and iron in an aqueous solution of cerium nitrate and ferric chloride with citric acid and ammonia, separating and drying the fibers soaked in the metal solutions, and calcining the resulting product to form cerium-iron-activated carbon. Sun discloses neither a particular substrate, nor the treatment of particular dyes.

CN 108993510 A by Yu et al. (Yu) discloses the preparation of a tire-based carbon catalyst for activating persulfate, prepared by crushing, magnetic separation, and low temperature pyrolysis of waste and old tires to obtain an activated carbon carrier, impregnating with 0.1 to 5.0 wt. % of CuO, $CeO_2$, $Fe_2O_3$, $Bi_2O_3$, and $Co_2O_3$, mixing, kneading, and pyrolysis to obtain the persulfate catalyst. Yu's catalyst can decompose organic wastewater or provide an organic wastewater removal rate of 95%. Yu discloses neither a particular substrate, nor a particular combination of metal oxides beyond Cu and Ce, nor the treatment of particular dyes (instead, removing ofloxacin).

CN 108993505 A by Huang et al. (Huang) discloses a tire carbon-based photo-Fenton catalyst loaded with 0.1 to 5.0 wt. % of one or more of CoO, $Fe_2O_3$, CuO, and/or $CeO_2$ for organic wastewater control. Huang's disclosure is similar to Yu's.

EP 2 632 576 B1 by Paul et al. (Paul) discloses a method for making a composite polyamide membrane involving applying polyfunctional amine and acyl halide monomers to a surface of a porous support and interfacially polymerizing the monomers to form a thin film polyamide layer. Paul may include an additional, dissimilar monomer in the interfacial polymerization, such as an aromatic monocarboxylate and a single amine-reactive functional group, and wherein the additional monomer and the polyfunctional acid halide monomer are applied from a common non-polar solution in a molar ratio of from 0.001:1 to 1:1. Alternatively or additionally, Paul may apply the additional monomer to the thin film polyamide layer from a 0.5 to 5% (w/v) non-polar solution. Paul's porous support may be of polysulfone, polyether sulfone, polyimide, polyamide, polyetherimide, polyacrylonitrile, poly(methyl methacrylate), polyethylene, polypropylene, or halogenated polymers. Paul does not disclose activated carbon, particularly not doped as an iron oxide and cerium oxide nanocomposite.

US 2014/0187413 A1 by Cabello et al. (Cabello) discloses nanocomposite materials comprising nano-clay supports for metal oxide particles which give the materials multi-functional properties. Specific additives based on layers of clays intercalated with metal oxides are reported to provide antimicrobial, oxygen sequestrating, catalytic, self-cleaning, and/or anti-abrasive capacity. Cabello's material may optionally contain other organic, metal, and/or inorganic compounds for compatibilization, dispersion, increased functionality of the metal oxides, and/or new functionalities, both passive of physical strengthening and active, such as biocide character, antioxidant, and chemical absorbency. Cabello's clay may incorporate oxides of Zn, Zr, Ce, Ti, Mg, Mn, Pd, Al, Fe, Cu, Mo, Cr, Va, Co, a Group 111 metal, and/or a Group XII metal. Cabello may use a thermoplastic, thermostable, and elastomeric matrix of PEs, polyesters, polyamides, polyimides, polyketones, polyisocyanates, polysulfones, PSs, phenol resins, amide resins, ureic resins, melamine resins, polyester resins, epoxy resins, PCs, PVPs, polyacrylates, rubbers and gums, PUs, silicones, aramides, polybutadiene, polyisoprenes, PANs, PVDFs, PVAs, PVOHs, PEVOH, PVCs, or PVDCs. Cabello does not disclose porous carbon or activated carbon, nor any particular substrate.

*J. Environ. Sci.* 2018, 65, 92-102 by Cheng et al. (Cheng) discloses methylene blue removal with raw activated carbon and iron/cerium-modified activated carbon by adsorption. Cheng reports the presence of $Fe_3O_4$ to lead to activated carbon-Fe—Ce having magnetic properties, simplifying separation from dye wastewater in a magnetic field and recycle. The adsorption behavior of Cheng's activated carbon-Fe—Ce followed a Langmuir isotherm and pseudo-second-order kinetic model. Cheng's activated carbon-Fe—Ce increased the maximum monolayer adsorption capacity by 27.31%, relative to raw activated carbon. Cheng's activated carbon-Fe—Ce can reportedly be used as an adsorbent to remove methylene blue from dye-containing wastewater. Cheng's material has a BET surface area of 776.2 $m^2/g$, an average pore diameter of 3.39 nm, a total pore volume of 0.65 $cm^3/g$, and a methylene blue removal value of 269 mg/g. Cheng does not disclose a particular substrate upon which its material is hosted, and uses a customary commercial activated carbon.

*J. Environ. Man.* 2018, 206, 170-177 by Tuzen et al. (Tuzen) discloses activated carbon from waste scrap tires, modified by Fe and Ce nanoparticles for high surface area and active sites for enhanced adsorption of the dye. Tuzen's nanocomposite was used for magnetic Rhodamine B removal from aqueous solutions, with an adsorption capacity 324.6 mg/g. Tuzen's activated carbon-Fe—Ce magnetic adsorbent is reportedly endothermic in character and follows pseudo-second-order kinetics. Tuzen does not disclose substrates for its material.

*IOSR J Appl. Chem.* 2018, 11(6), 71-74 by Imam et al. (Imam) discloses thermally reprocessing waste tires into activated charcoal. Imam used purification methods which increased the surface area and decreased the amount of contaminants present in the powdered carbon. Imam uses no iron or cerium oxides in its material, nor a particular substrate.

*Arab. J Chem.* 2015, 4, 1-12, entitled "Adsorption of chlorinated organic compounds from water with cerium oxide-activated carbon composite," by Alhoosshani et al. (Alhooshani) discloses adsorptive removal of $CH_2Cl_2$, $CHCl_3$, and $CCl_4$ from aqueous solutions at 25° C. by activated carbon loaded with $CeO_2$ nanoparticles. Alhooshani's adsorption process onto activated carbon-$CeO_2$ is reportedly well-described by the pseudo second-order model, and best-fit by the intraparticle diffusion model. Alhooshani's material involves preparing activated carbon from rubber tires by heating at 300, 500, and 900° C. sequentially and co-precipitating the activated carbon and cerium oxide from an aqueous suspension of activated carbon and cerium nitrate at pH 7. Alhooshani discloses no iron oxide in its activated carbon-$CeO_2$, nor a particular substrate for the activated carbon-$CeO_2$.

*J. Biomed. Mater. Res.* 1980, 14(6), 743-751 by Wicks et al. (Wicks) discloses polymer-coated, activated charcoal granules for the direct detoxification of blood in cases of uraemia and drug overdose. Wicks uses nylon 6 applied as a thin coat to activated charcoal granules. Wicks does not to mention iron oxide or cerium oxide, and Wicks's material is not indicated to be useful for adsorbing dyes from water.

*Ultrasonics Sonochem.* 2018, 44, 261-271 by Hatami (Hatami) discloses using polyamic acid, the precursor of polyimide, for preparing polyimide-$CeO_2$ nanocomposites by ultrasonic-assisted insertion of surface-modified $CeO_2$ nanoparticles into a polyimide matrix. Hatami modifies $CeO_2$ using hexadecyltrimethoxysilane as a binder with ultrasonic waves. Hatami forms polyimide by sonochemical imidization as a molecular hook, eliminating acetic acid in the main chain of macromolecule, and acetylation of side chains of polyamic acid. Hatami uses acetylation of the hook structure to trap the modified nanoparticles, then a sonochemical process to prepare polyimide nanocomposites. Hatami reports uniform distribution of crystalline $CeO_2$ nanocomposites in amorphous polyimide. Hatami does not use porous carbon, activated carbon, or iron oxide, nor a pure polyamide.

The conference paper from Nanocon 2012 in Brunn, Czech Republic, entitled "Sorption Process Using Polyamide Nanofibres to Remove Dye from Simulated Wastewater," by Wiener et al. (Wiener) discloses the use of polyamide 6 nanofibers as a sorbent material for removal of dye on textile wastewater, such as Acid Blue 41, Acid Yellow 42, and C.I. Acid Blue 78 at 10 mg/L, for sorption on electrospun polyamide 6 with a reel weight of 12 $g/m^2$ under vacuum pressure at 20, 30, 40, 50, and 60° C. Wiener reports that polyamide 6 nanofibers may be used for dye removal, and is able to absorb dye at room temperature. Wiener does not disclose porous carbon, activated carbon, cerium oxide, or iron oxide, nor a particular aramide substrate.

In light of the above, a need remains for materials for dye removal including polyamide substrates and metal oxide-doped activated carbon, particularly containing ceria and iron oxide(s), particularly from organic waste, such as tires, and methods of making and using such materials.

SUMMARY OF THE INVENTION

Aspects of the invention provide methods of preparing a polyamide-supported activated carbon modified with iron oxide and cerium oxide nanocomposite. Such methods may comprise: suspending activated carbon in a solution comprising iron ions at pH in a range of from 7.0 to 10, to obtain a suspension; stirring and heating the suspension to form an activated carbon-iron oxide composite; combining cerium ions with the activated carbon-iron oxide composite in a liquid to form a reaction mixture at a pH in a range of from 7.0 to 10.0; precipitating the activated carbon, iron oxide, cerium oxide by heating the reaction mixture to form an unsupported nanocomposite comprising, bound together, the activated carbon, iron oxide, and cerium oxide; forming and reacting a monomer dispersion comprising the unsupported nanocomposite, an aromatic diamine and/or triamine, and an aromatic tricarboxylate and/or dicarboxylate, thereby forming a polymeric solid comprising a polyamide comprising, in reacted form, the aromatic diamine and the reactive aromatic tricarboxylate, bound to the unsupported composite. Such methods may be modified by any permutation of the features described herein, particularly the following.

The (unsupported) nanocomposite may comprise: carbon in a range of from 66 to 72 wt. %; iron in a range of from 10 to 15 wt. %; cerium in a range of from 7 to 14 wt. %; and/or oxygen in a range of from 8 to 18 wt. %.

The stirring and heating may be carried out: at a temperature in a range of from 60 to 100° C.; and for a time in a range of from 2 to 10 hours, to form the activated carbon-iron oxide composite.

The iron ions in the suspending may be in the form of a salt or complex comprising nitrate, fluoride, chloride, bromide, iodide, formate, oxalate, citrate, perchlorate, tetrafluoroborate, sulfate, fluorosilicate, iodate, or a combination of two or more of any of these. The iron ions may comprise at least 75 wt. % Fe(III).

The solution comprising the iron ions and/or the liquid comprising the cerium ions may comprise a liquid alcohol, a liquid diol, and/or water. The solution comprising the iron ions and/or the liquid in the suspending comprises, based on volume: 30 to 50% ethanol; 2.5 to 10.5% ethylene glycol; and 35 to 66.5% water.

The cerium ions in the combining may be in the form of a salt or complex comprising nitrate, fluoride, chloride, bromide, iodide, selenate, formate, oxalate, citrate, perchlorate, tetrafluoroborate, sulfate, fluorosilicate, iodate, or a combination of two or more of any of these.

The precipitating may comprise heating at a temperature in a range of from 70 to 110° C., optionally for a time in a range of from 3 to 8 hours. The forming and reacting may comprise heating to a temperature in a range of from 50 to 100° C., optionally for a time in a range of from 1 to 24 hours.

The aromatic diamine and/or triamine may have a general structure

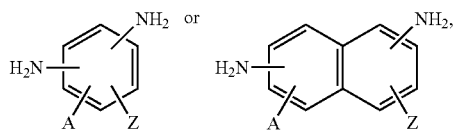

wherein A and Z are independently selected from H, F, Cl, $CH_3$, $CH_2CH_3$, OH, or $OCH_3$, and the amines are spaced by 1, 2, 3, 4, or 5 aromatic ring carbons. The aromatic diamine and/or triamine may comprise at least 75 wt. % m-phenylenediamine, relative to total amine weight.

The aromatic tricarboxylate and/or dicarboxylate may have a general structure

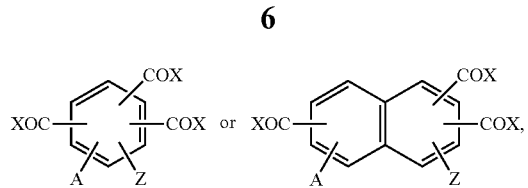

wherein A and Z are independently selected from H, F, Cl, $CH_3$, $CH_2CH_3$, OH, or $OCH_3$, X is independently OH, Cl, Br, or forms an anhydride, and the carboxylates are spaced by 1, 2, 3, 4, or 5 aromatic ring carbons. The aromatic tricarboxylate and/or dicarboxylate may comprise at least 75 wt. % trimesoyl chloride.

The polymeric solid may be formed upon a glass or ceramic surface. The unsupported nanocomposite may have a BET surface area in a range of from 385 to 465 $m^2/g$, a micropore surface area in a range of from 250 to 425 $m^2/g$, a Horvath-Kawazoe maximum pore volume in a range of from 0.55 to 0.75 $cm^3/g$, a median pore width in a range of from 50 to 150 Å, a BJH average pore width in a range of from 10 to 13 nm, and/or a t-plot external surface area in a range of from 235 to 335 $m^2/g$.

Aspects of the invention provide compositions comprising: a polyamide; a nanocomposite comprising, bound together, activated porous carbon, iron oxide, and cerium oxide, the nanocomposite having an elemental composition of carbon in the range of 66 to 72 wt. %, iron in the range of 10 to 15 wt. %, cerium in the range of 7 to 14 wt. %, and oxygen in the range 8 to 18 wt. %, wherein the polyamide is bonded to the nanocomposite, and wherein the nanocomposite has adsorption capacity in a range of from 300 to 600 mg/g. Such compositions may be modified by any permutation of the features described herein, particularly the following or those above.

The compositions may have a BET surface area in a range of from 350 to 550 $m^2/g$, a micropore surface area in a range of from 300 to 400 $m^2/g$ volume, and/or a pore volume in a range of from 0.4 to 1.0 $cm^3/g$.

The polyamide may comprise, in polymerized form, an aromatic diamine with a general structure

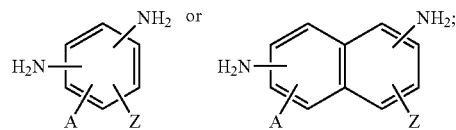

an aromatic tricarboxylate with a general structure

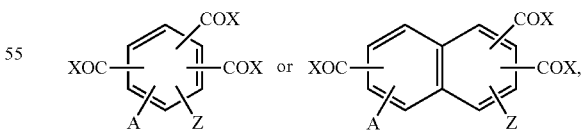

wherein A and Z are independently selected from H, F, Cl, $CH_3$, $CH_2CH_3$, OH, or $OCH_3$, X is independently OH, Cl, Br, or forms an anhydride, and wherein the amines and carboxylates are independently spaced by 1, 2, 3, 4 or 5 aromatic ring carbons.

Aspects of the invention provide methods of removing a dye from water, which methods may comprise: contacting water comprising a dye with any permutation of the inventive composition described herein; and separating the water and the composition, thereby removing the dye with the composition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
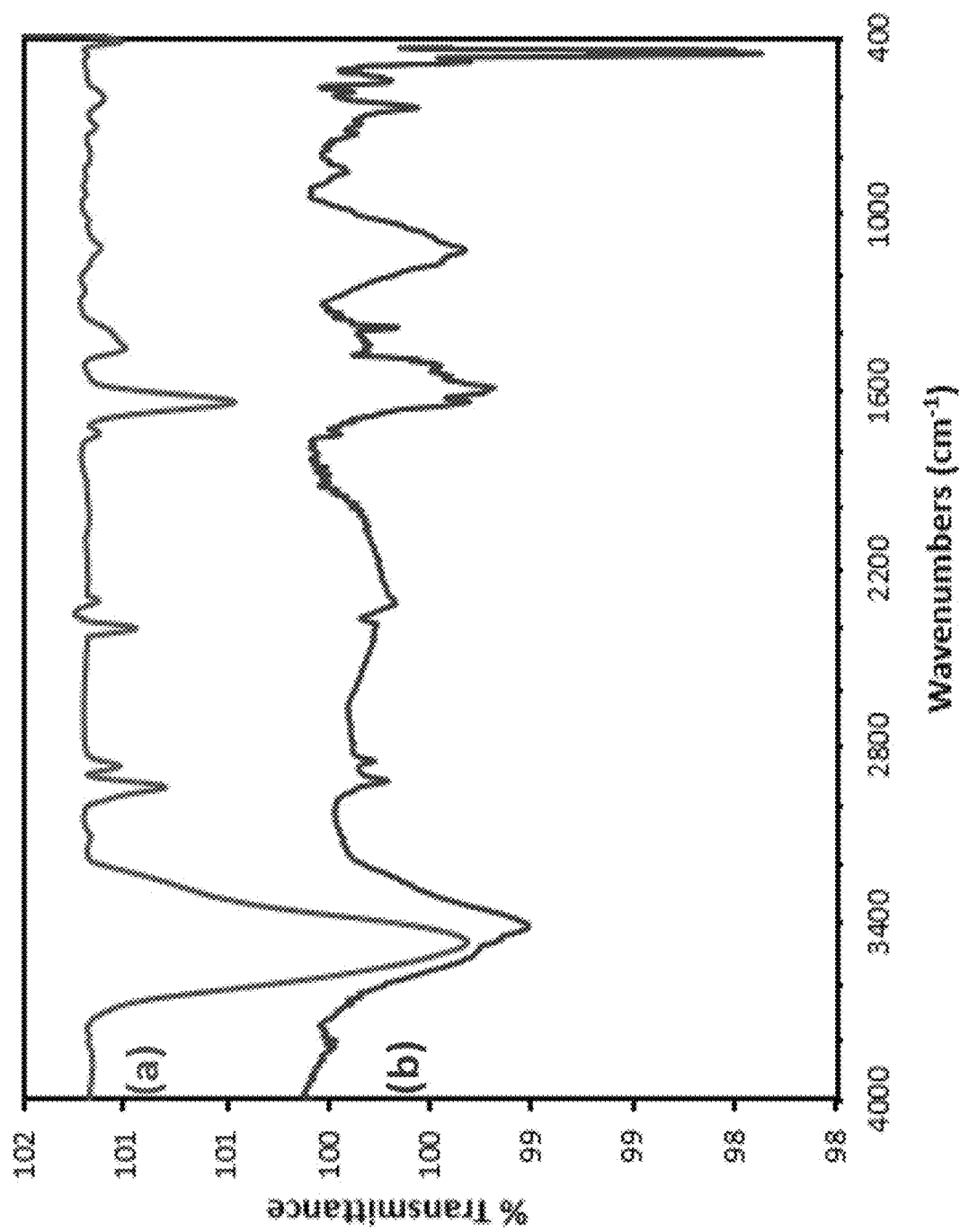
FIG. 1 shows Fourier-transform infrared (FT-IR) spectra of exemplary activated carbon (a) and a nanocomposite of the exemplary activated carbon modified with iron oxide and cerium oxide (b)

Aspects of the invention provide methods of preparing a polyamide-supported activated carbon nanocomposite modified with iron oxide and cerium oxide, i.e., a nanocomposite comprising (i) activated carbon, (ii) cerium oxide, and (iii) iron oxide in an attached, associated, bonded, trapped, held, embedded, held, lodged, and/or otherwise non-loosely combined or "bound" form. Polyamide-supported is meant to convey that the activated carbon-Fe—Ce nanocomposite is bonded, either covalently or otherwise, to the nanocomposite, e.g., on functional groups on the activated carbon, via metal bonds, via hydrogen bonding (and/or other secondary bonding), and/or via mechanical entanglement. The activated carbon modified with iron oxide and cerium oxide is, for example, bonded together into a substantially uniform solid material with the metal oxides embedded and/or mechanically trapped into the activated carbon sheets and/or adhered via secondary and/or metal bonds.

Inventive methods may comprise suspending activated carbon in a solution comprising iron ions at pH in a range of from 7.0 to 10, e.g., at least 7, 7.25, 7.5, 7.75, 8, 8.25, 8.5, 8.75, or 9 and/or up to 10, 9.75, 9.5, 9.25, 9, 8.75, 8.5, 8.25, or 8, to obtain a suspension. The activated carbon (or carbon black) may be produced, e.g., by incinerating waste material, such as tired, plastics, paints, rice husks, etc. The activated carbon may have an average particle size in a range of from 20 to 25, 24 to 33, 28 to 36, 30 to 35, 39 to 55, 49 to 73, 70 to 96, 180 to 200, 250 to 350 nm, or combinations of two or more of these. The activated carbon may be a powdered activated carbon, granular activated carbon, extruded activated carbon, bead activated carbon, impregnated carbon, polymer coated carbon, and/or woven carbon.

The stirring and heating may be carried out: at a temperature in a range of from 60 to 100° C., e.g., at least 60, 65, 70, 75, 80, or 85° C. and/or up to 100, 95, 90, 85, 80, or 75° C.; and for a time in a range of from 2 to 10 hours, e.g., at least 1, 2, 3, 4, 5, 6, 7 or 8 hours and/or up to 10, 9, 8, 7, 6, 5, or 4 hours, to form the activated carbon-iron oxide composite.

The iron ions in the suspending may be in the form of a salt or complex comprising nitrate, fluoride, chloride, bromide, iodide, formate, oxalate, citrate, perchlorate, tetrafluoroborate, sulfate, fluorosilicate, iodate, or a combination of two or more of any of these. The iron ions may comprise at least 75, 80, 85, 90, 91, 92, 92.5, 93, 94, 95, 96, 97, 97.5, 98, 99, 99.1, 99.5, or 99.9 wt. % of Fe(III), based on total iron weight.

The suspension comprising the activated carbon and the iron ions may be stirred and heated to form an activated carbon-iron oxide composite, i.e., an activated carbon having iron oxide (or a precursor to iron oxide) adsorbed, adhered, bonded, trapped, and/or otherwise non-loosely combined with the carbon network. Cerium ions may be combined with the activated carbon-iron oxide composite, e.g., in a liquid to form a reaction mixture at a pH in a range of from 7.0 to 10.0, e.g., at least 7, 7.25, 7.5, 7.75, 8, 8.25, 8.5, 8.75, or 9 and/or up to 10, 9.75, 9.5, 9.25, 9, 8.75, 8.5, 8.25, or 8. Alternatively, the cerium may be combined with the activated carbon before the iron and/or the iron and cerium may be added at the same time.

The cerium ions in the combining may be in the form of a salt or complex comprising nitrate, fluoride, chloride, bromide, iodide, selenate, formate, oxalate, citrate, perchlorate, tetrafluoroborate, sulfate, fluorosilicate, iodate, or a combination of two or more of these.

The solution comprising the iron ions and/or the liquid comprising the cerium ions may comprise a liquid alcohol (such as methanol, ethanol, propanol, isopropanol, and/or butanol), a liquid diol (such as ethylene glycol, propylene glycol, butylenes glycol, glycerol-triols and other polyols being covered by "diol", etc.), and/or water. The solution comprising the iron ions and/or the liquid in the suspending comprises, based on volume: 30 to 50% ethanol, e.g., at least 30, 32.5, 35, 37.5, 40, 42.5, or 45% and/or up to 50, 47.5, 45, 42.5, 40, 37.5, 35, 32.5, 30% ethanol (and/or any other alcohol); 2.5 to 10.5% ethylene glycol, e.g., at least 2.5, 3.33, 4, 5, 6, 6.67, 7.5, 8, 9, or 10% and/or up to 10.5, 10.25, 10, 9.75, 9.5, 9.25, 9, 8.75, 8.5, 8.25, 8, 7.75, 7.5, 7.25, 7, 6.75, 6.67, 6.5, 6.33, 6.25, 6, 5.75, 5.67, 5.5, 5.33, 5.25, or 5% ethylene glycol (and/or any other diol); and 35 to 66.5% water, e.g., at least 35, 37.5, 40, 42.5, 45, 47.5, 50, 52.5, 55, 57.5, or 60% and/or up to 66.5, 65, 62.5, 60, 57.5, 55, 52.5, 50, 47.5, 45, 42.5, or 40%. In principle, any mixture of solvent or single solvent may be used for the reaction, so long as it sufficiently solubilizes the ions and/or the carbon to achieve a desired distribution on the activated carbon. Such solvents may included, for example, pyridine, N,N-dimethylformamide (DMF), N,N-dimethylacetamide, N-methyl pyrrolidone (NMP), hexamethylphosphoramide (HMPA), dimethyl sulfoxide (DMSO), acetonitrile, tetrahydrofuran (THF), 1,4-dioxane, dichloromethane, chloroform, carbon tetrachloride, dichloroethane, acetone, ethyl acetate, pet ether, pentane, hexane(s), cyclohexane, decane(s), decalin, THF, dioxane, benzene, toluene, xylene(s), o-dichlorobenzene, diethyl ether, methyl t-butyl ether, diisopropyl ether, ethylene glycol, methanol, ethanol, isopropanol, propanol, n-butanol, and/or water.

The activated carbon, iron oxide, cerium oxide in the reaction mixture may be heated to form an unsupported nanocomposite comprising, bound together, the activated carbon, iron oxide, and cerium oxide. The (unsupported) nanocomposite may comprise: carbon in a range of from 66 to 72 wt. %, e.g., at least 66, 66.5, 67, 67.5, 68, 68.5, 68, 68.5, or 69 wt. % and/or up to 72, 71.5, 71, 70.5, 70, 69.5, 69, 68.5, or 68 wt. %; iron in a range of from 10 to 15 wt. %, e.g., at least 10, 10.25, 10.5, 10.75, 11, 11.25, 11.5, 11.75, or 12 wt. % and/or up to 15, 14.5, 14, 13.5, 13, 12.75, 12.5, 12.25, 12, 11.75, 11.5, 11.25, or 11 wt. %; cerium in a range of from 7 to 14 wt. %, e.g., at least 7, 7.25, 7.5, 7.75, 8, 8.25, 8.5, 8.75, 9, 9.25, or 9.5 wt. % and/or up to 14, 13.5, 13, 12.5, 12, 11.5, 11, 10.75, 10.5, 10.25, 10, 9.75, 9.5, 9.25, 9, or 8.75 wt. %; and/or oxygen in a range of from 8 to 18 wt. %, e.g., at least 8, 8.5, 9, 9.25, 9.5, 9.75, 10, 10.25, 10.5, 10.75, or 11 wt. % and/or up to 18, 17.5, 17, 16.5, 16, 15.5, 15, 14.5, 14, 13.75, 13.5, 13.25, 13, 12.75, 12.5, 12.25, 12, 11.75, or 11.5 wt. %.

A monomer dispersion may be formed and reacted comprising the unsupported nanocomposite, an aromatic diamine and/or triamine, and an aromatic tricarboxylate and/or dicarboxylate, thereby forming a polymeric solid comprising a polyamide comprising, in reacted form, the aromatic diamine and the reactive aromatic tricarboxylate, bound to the unsupported composite. The aromatic diamine/triamine and/or tricarboxylate/dicarboxylate may contain a core of a phenyl group, biphenyl, naphthylene, anthracene, pyridine, indene, 3H-indole, 1H-indole, 2H-isoindole, benzimidazole, 7-azaindole, 4-azaindole, 5-azaindole, 6-azaindole, 7-azaindazole, pyrazolo[1,5-a]pyrimidine, purine, benzofuran, isobenzofuran, benzo[c]thiophene, benzo[b]thiophene, benzo[d]isoxazole, benzo[c]isoxazole, benzo[d]isothiazole, benzo[c]isothiazole, benzo[d]oxazole, benzo[d]thiazole, benzo[c][1,2,5]thiadiazole, 1,2-benzisothiazole-3(2H)-one, adenine, guanine, or the like, though it may be preferred in some applications that the aromatic core contain no heteroatoms. On a single ring, the amines/carboxylates may be in ortho, meta, or para positions with respect to each other. Other examples of useful monomers may include 3,3'-diaminodiphenylsulfone, 4,4'-(m-phenylenediisopropylidene)dianiline, 4,4'-(p-phenylenediisopropylidene)dianiline, 3-aminobenzylamine, 4-aminobenzylamine, 2-(4-aminophenyl)-1H-benzimidazole-5-amine, [3-(4-aminobenzoyl)oxyphenyl)]4-aminobenzoate, etc., and/or those described in US 2006/0232198 A1, U.S. Pat. Nos. 7,790,892, 6,541,129, EP 2 031 670, U.S. Pat. No. 3,637,534, the 2011 American Institute of Aeronautics and Astronautics article entitled "Generation and Evaluation of Lunar Dust Adhesion Mitigating Materials" by Wohl et al. (DOI: 10.2514/6.2011-3676), *J Membrane Sci.* 2012, 387-388, 54-65, *J. Appl. Polym. Sci.* 2002, 85(1), 38-44, or *Chromatographia* 2013, 76(1-2), 23-31, each of which is incorporated by reference herein in its entirety.

The precipitating may comprise heating at a temperature in a range of from 70 to 110° C., e.g., at least 70, 72.5, 75, 77.5, 80, 82.5, 85, 87.5, 90, 92.5, 95, 97.5, or 100° C. and/or up to 110, 107.5, 105, 102.5, 100, 97.5, 95, 92.5, 90, 87.5, 85, 82.5, 80, 77.5, or 75° C., optionally for a time in a range of from 3 to 8 hours, e.g., at least 4, 4.5, 5, 5.5, 6, 6.5, or 7 hours and/or up to 8, 7.5, 7, 6.5, 6, 5.5, 5, 4.5, or 4 hours. The forming and reacting may comprise heating to a temperature in a range of from 50 to 100° C., e.g., at least 50, 52.5, 55, 57.5, 60, 62.5, 65, 67.5, 70, 72.5, 75, 77.5, 80, 82.5, 85, 87.5, 90, 92.5, or 95° C. and/or up to 100, 97.5, 95, 92.5, 90, 87.5, 85, 82.5, 80, 77.5, 75, 72.5, 70, 67.5, 65, 62.5, 60, 57.5, or 55° C., optionally for a time in a range of from 1 to 24 hours, e.g., at least 1, 2, 4, 6, 8, 10, or 12 hours and/or up to 48, 36, 30, 24, 22, 20, 18, 16, 14, or 12 hours.

The aromatic diamine and/or triamine may have a general structure

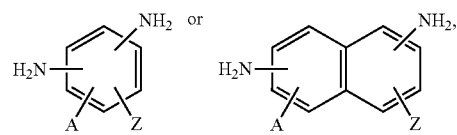

or any of the above core molecules with functionalization as described above and to follow, wherein A and Z are independently selected from H, F, Cl, $CH_3$, $CH_2CH_3$, OH, or $OCH_3$, and the amines are spaced by 1, 2, 3, 4, or 5 aromatic ring carbons. The aromatic diamine and/or triamine may comprise at least 75, 80, 85, 90, 91, 92, 92.5, 93, 94, 95, 96, 97, 97.5, 98, 99, 99.1, 99.5, or 99.9 wt. % m-phenylenediamine, relative to total amine weight.

The aromatic tricarboxylate and/or dicarboxylate may have a general structure

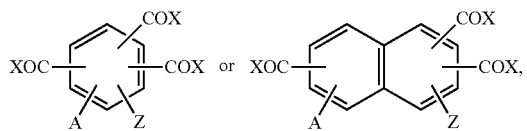

or any of the above core molecules with functionalization as described above and to follow, wherein A and Z are independently selected from H, F, Cl, $CH_3$, $CH_2CH_3$, OH, or $OCH_3$, X is independently OH, Cl, Br, or forms an anhydride, and the carboxylates are spaced by 1, 2, 3, 4, or 5 aromatic ring carbons. The aromatic tricarboxylate and/or dicarboxylate may comprise at least 75, 80, 85, 90, 91, 92, 92.5, 93, 94, 95, 96, 97, 97.5, 98, 99, 99.1, 99.5, or 99.9 wt. % trimesoyl chloride.

The polymeric solid may be formed upon a glass or ceramic surface. The unsupported nanocomposite may have a BET surface area in a range of from 385 to 465 $m^2/g$, e.g., at least 385, 387.5, 390, 392.5, 395, 397.5, 400, 402.5, 405, 407.5, 410, 412.5, 415, 417.5, 420, 422.5, 425, 427.5, or 430 $m^2/g$ and/or up to 465, 462.5, 460, 457.5, 455, 452.5, 450, 447.5, 445, 442.5, 440, 437.5, 435, 432.5, 430, 427.5, 425, 422.5, or 420 $m^2/g$. The unsupported nanocomposite may have a micropore surface area in a range of from 250 to 425 $m^2/g$, e.g., at least 250, 255, 260, 265, 270, 275, 280, 285, 290, 295, 300, 302.5, 305, 307.5, 310, 312.5, 315, 317.5, 320, 322.5, 325, 327.5, 330, 332.5, 335, 337.5, 340, 342.5, 345, 347.5, 350, 352.5, 355, 357.5, 360 $m^2/g$ and/or up to 425, 420, 415, 410, 405, 400, 397.5, 395, 392.5, 390, 387.5, 385, 382.5, 380, 377.5, 375, 372.5, 370, 367.5, 365, 362.5, 360, 357.5, or 355 $m^2/g$. The unsupported nanocomposite may have a Horvath-Kawazoe maximum pore volume (at p/p° of 0.993) in a range of from 0.55 to 0.75 $cm^3/g$, e.g., at least 0.55, 0.575, 0.5875, 0.6, 0.6125, 0.625, 0.6375, or 0.65 $cm^3/g$ and/or 0.75, 0.7375, 0.725, 0.7125, 0.7, 0.6875, 0.675, 0.65, 0.6375, 0.625, 0.6125, or 0.6 $cm^3/g$. The unsupported nanocomposite may have a median pore width in a range of from 50 to 150 Å, e.g., at least 50, 52.5, 55, 57.5, 60, 62.5, 65, 67.5, 70, 72.5, 75, 77.5, 80, 82.5, 85, 87.5, 90, 92.5, 95, 97.5, or 100 Å and/or up to 150, 145, 140, 135, 130, 125, 122.5, 120, 117.5, 115, 112.5, 110, 107.5, 105, 102.5, 100, 97.5, 95, 92.5, or 90 Å. The unsupported nanocomposite may have a BJH average pore width in a range of from 10 to 13 nm, e.g., at least 10, 10.5, 11, 11.1, 11.2, 11.33, 11.4, 11.5, 11.55, or 11.6 nm and/or up to 13, 12.75, 12.5, 12.25, 12, 11.9, 11.8, 11.7, 11.67, 11.6, or 11.5 nm. The unsupported nanocomposite may have a t-plot external surface area in a range of from 235 to 335 $m^2/g$, e.g., at least 235, 240, 245, 250, 255, 260, 262.5, 265, 267.5, 270, 272.5, 275, 277.5, 280, 282.5, 285, 287.5, or 290 $m^2/g$ and/or up to 335, 330, 325, 320, 315, 310, 305, 302.5, 300, 297.5, 295, 292.5, 290, 287.5, 285, 282.5, or 280 $m^2/g$.

Useful polyamides may comprise, in polymerized form, at least 75, 80, 85, 90, 91, 92, 92.5, 93, 94, 95, 96, 97, 97.5, 98, 99, 99.1, 99.5, or 99.9 wt. % of aromatic monomers, relative to total monomer weight. Relevant polyamides may contain, on average, at least (and/or up to) 1 cross-linking covalent bond per 5, 7.5, 10, 12, 14, 15, 17.5, 20, 25, 35, 50, 75, or 100 polymerized monomers. Polyesters of otherwise similar form to the polyamides, e.g., exchanging amines for alcohols in bonding entities, may also be implemented in relevant applications. Grafting the metal oxide-modified activated carbon to a polymer may improve the longevity of the nanocomposite to chemical and/or photodecomposition (e.g., oxidation, UV breakdown, dissolution, metal oxide loss, etc.), and/or may improve the adsorption capacity and/or separability of the nanocomposite from aqueous solutions. The polymer grafting may also improve the adhesion to substrate surfaces, such as glass, ceramics, plastics (PMMA, PET, PE, PP, PS, etc.), particularly via in situ interfacial polymerization.

Aspects of the invention provide compositions comprising: a polyamide; a nanocomposite comprising, bound together, activated porous carbon, iron oxide, and cerium oxide, the nanocomposite having an elemental composition of carbon in the range of 66 to 72 wt. % (or any range or percentage described above), iron in the range of 10 to 15 wt. % (or any range or percentage described above), cerium in the range of 7 to 14 wt. % (or any range or percentage described above), and oxygen in the range 8 to 18 wt. % (or any range or percentage described above), wherein the polyamide is bonded to the nanocomposite, and wherein nanocomposite has adsorption capacity in a range of from 300 to 600 mg/g, e.g., at least 300, 305, 310, 315, 320, 325, 330, 335, 340, 345, 350, 355, or 360 mg/g and/or up to 600, 575, 550, 525, 500, 475, 450, 440, 430, 425, 420, 415, 410, 405, 400, 395, 390, 385, 380, 375, 370, 365, 360, 355, or 350 mg/g.

The compositions may have a BET surface area in a range of from 350 to 550 $m^2/g$ (or any range or area per gram described above), a micropore surface area in a range of from 300 to 400 $m^2/g$ (or any range or area per gram described above), and/or a pore volume in a range of from 0.4 to 1.0 $cm^3/g$ (or any range or volume per gram described above).

The polyamide may comprise, in polymerized form, an aromatic diamine (or triamine) of the variety described above and/or with a general structure

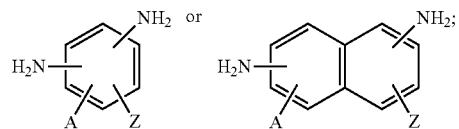

and
an aromatic tricarboxylate (or dicarboxylate) of the variety described above and/or with a general structure

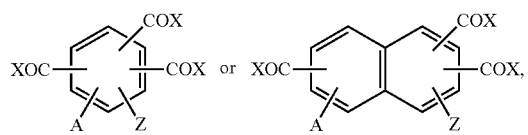

wherein A and Z are independently selected from H, F, Cl, $CH_3$, $CH_2CH_3$, OH, or $OCH_3$, X is independently OH, Cl (i.e., acid chloride), Br (i.e., acid bromide), or forms an anhydride, and wherein the amines and carboxylates are independently spaced by 1, 2, 3, 4 or 5 aromatic ring carbons.

Aspects of the invention provide methods of removing a dye from water, which methods may comprise: contacting water comprising a dye (or a plurality of dyes) with any permutation of the inventive composition described herein; and separating the water and the composition, thereby removing the dye with the composition. The dyes may be acid dyes, basic dyes, direct or substantive dyes, mordant dyes, vat dyes, reactive dyes, disperse dyes, azo dyes, sulfur dyes, and the like, including acridine dyes, derivates of acridine, anthraquinone dyes, derivates of anthraquinone, arylmethane dyes, diarylmethane dyes, based on diphenyl methane, triarylmethane dyes, derivates of triphenylmethane, azo dyes, based on —N=N— azo structure, phthalocyanine dyes, derivatives of phthalocyanine, quinone-imine dyes, derivatives of quinone, azin dyes, eurhodin dyes, safranin dyes, derivates of safranin, indamins, indophenol dyes, derivatives of indophenols, oxazin dyes, derivatives of oxazin, oxazone dyes, derivates of oxazone, thiazine dyes, thiazole dyes, safranin dyes, xanthene dyes, fluorene dyes, derivatives of fluorine, pyronin dyes, fluorone dyes, based on fluorine, rhodamine dyes, derivatives of Rhodamine, and/or phenothiazine dye, such as Methyl Violet 2B, Methyl violet 6B, Methyl violet 10B (Crystal violet), Methyl blue, Methylene blue, Prussian blue, Egyptian blue, etc.

Inventive materials may exclude, or use no more than 15, 10, 7.5, 5, 4, 3, 2.5, 2, 1, 0.5, 0.1, 0.01, 0.001, 0.0001, or 0.00001 wt. %, relative to the total coating material weight, of clays, such as kaolinites, montmorillonites, etc., deflocculants, feldspars, feldspar sands, kaolin, carbonates, zirconium, frits, silica, and silica sands, either individually or in combination. Inventive materials may exclude, or use no more than 15, 10, 7.5, 5, 4, 3, 2.5, 2, 1, 0.5, 0.1, 0.01, 0.001, 0.0001, or 0.00001 wt. %, relative to the total coating material weight, of Zn, Zr, Ti, Mg, Mn, Pd, Pt, Al, Ag, Cu, Mo, Cr, Si, Va, Co, Ca, and/or Ni, either individually or in combination. Inventive materials may exclude, or use no more than 15, 10, 7.5, 5, 4, 3, 2.5, 2, 1, 0.5, 0.1, 0.01, 0.001, 0.0001, or 0.00001 wt. %, relative to the total coating material weight, of $TiO_2$, $SiO_2$, $Al_2O_3$, MgO, CaO, $K_2O$, $Na_2O$, $SO_3$, MnO, and/or $PdO_2$, either individually or in combination.

Inventive materials may exclude, or use no more than 15, 10, 7.5, 5, 4, 3, 2.5, 2, 1, 0.5, 0.1, 0.01, 0.001, 0.0001, or 0.00001 wt. %, relative to the total coating material weight, of thermoplastic and/or elastomeric polymers, such as polyolefins (PE, PP, PIB, PB, polybutadiene, etc.), polyesters (PET, PBT, PEN, etc), polyamides (nylon 66, nylon 6, nylon 12, etc.), polyimides, polyketones, polyisocyanates, polysulfones, PSs (such as polystyrene and ring-functionalized and/or methine-functionalized polystyrene or co-polystyrene analogs), phenol resins, amide resins, ureic resins, melamine resins, epoxy resins, PCs, PVPs, polyacrylates, rubbers (polybutadiene, SBR, nitrile rubber, olefinic elastomers, etc.), gums (xanthum, guar, etc.), PUs, silicones, aramides, polyisoprenes, PANs, PVAs, PVOHs, PEVOH, flouropolymers (PVDFs, PVDCs, PVCs, etc.), either individually or in combination.

Inventive materials may be used to purify and/or control contaminant emissions in gas streams and/or liquid streams derived from coal-fired power plants, biomass-fired power plants, metal processing plants, crude-oil refineries, chemical plants, textile facilities, dying facilities, bleaching facilities, polymer plants, pulp and paper plants, cement plants, waste incinerators, food processing plants, gasification plants, and/or syngas plants.

Inventive magnetic composite can have a higher adsorptive potential for organic contaminants in water than materials in the art (particularly those free of Fe and/or Ce) due to its high capacity, ease of producibility, practicability, cost-effectiveness, rapidity, selectivity, and sensitivity for the extraction of dye product pollution from waste waters. Aspects of the invention may provide for the elimination of Rhodamine B dye from aqueous solutions, or at least 75, 80, 85, 90, 91, 92, 92.5, 93, 94, 95, 96, 97, 97.5, 98, 99, 99.1, 99.5, or 99.9 wt. % of a total weight of the organic content in the water, using such composites.

EXAMPLES

Reagents and equipment: Cerium nitrate hexahydrate ($Ce(NO_3)_3.6H_2O$), Ferric Nitrate ($Fe(NO_3)_3.9H_2O$) and ethylene glycol with reagent grade were obtained from SigmaAldrich. 1000 mg/L rhodamine B stock solution was prepared (Merck, Darmstadt, Germany) in distilled water. The pH measurement was conducted by using a Sartorius pp-15 model pH meter (Germany). The rhodamine B concentrations were determined at 554 nm using a Perkin-Elmer Lambda 35 UV-vis spectrometer (USA).

Preparation of the Magnetite Nanocomposite 7.0 g of activated carbon obtained from waste tires (also possible from other sources) was dispersed in 150 mL of deionized water and 100 mL ethanol using a sonicator for five hours. The activated carbon was obtained by heating the carbon source (powdered waste tire rubber) at a temperature of up to 700° C. in a flow of inert gas (e.g., nitrogen) for 2 h. After cooling, the obtained carbon was activated by treatment with 1 molar nitric acid for 3 h. Then separated and dried. After sonication, 12.53 mL of 1 molar ferric nitrate, $Fe(NO_3)_3.9H_2O$, solution was added gradually to the dispersion solution. The activated carbon-ferric nitrate mixture was combined with 20 mL of ethylene glycol solution and then stirred for 6 hours at a pH of 8 to 9 and at a temperature of 80° C. An iron-containing activated carbon precipitate was filtered and dried at 110° C. and then calcined at 350° C. for 4 hours, to give an activated carbon-iron oxide material. The activated carbon-iron oxide material was then dispersed in an ethanol/deionized water solution (100/150 mL), mixed with 20 mL ethylene glycol, and stirred for 5 hours. After the dispersion and mixing, 5 mL solution of 1 molar cerium nitrate hexahydrate was introduced into the obtained final solution at a pH of 8 to 9. The activated carbon-iron-cerium precipitate obtained after the reflux process at 90° C. for 5 hours was washed and dried. The final nanocomposite was subjected to a calcination process at 350° C. for 4 hour to make sure that there was sufficient settlement of Fe and Ce metals onto the surface of the activated carbon.

The structure of the nanocomposite was characterized by adsorption and desorption of nitrogen at −196° C. on a Micromeritics ASAP 2020 surface area and a porosimetry analyzer. X-ray diffraction patterns of the synthesized nanocomposites were performed on a Rigaku Miniflex II desktop X-ray diffractometer with Cu-Kα radiation (wavelength=1.5418 A) and an X-ray gun operating at a voltage of 40 kV and a current of 200 mA. Data was collected from 2θ=0-80° at a scan rate of 4°/min.

The surface of the synthesized nanocomposite was evaluated by a low vacuum JEOL JSM-6610LV scanning electron microscope (SEM) with a tungsten electron gun. FT-IR was used for structural evaluation. The spectra were obtained using a Thermo Electron (USA) Nicolet 6700 spectrometer of a resolution of 2.0 cm$^{-1}$ with a deuterated triglycine sulfate detector and an OMNIC software. The FT-IR analyses were performed from the pellet samples with the KBr in a wavenumber range of 4000 to 400 cm$^{-1}$.

Batch Adsorption Procedure

The parameters were identified using the experimental design. A total of 21 experiments were designed, in Tables 1 and 2, and then performed to characterize and understand the relationship of parameters including pH, dosage, initial concentration, and contact time.

TABLE 1

Factors and limits in the central composite design (CCD).

| Variable | Low(−) | Center (0) | High(+) |
|---|---|---|---|
| pH | 2 | 5 | 7 |
| Adsorbent Dosage (mg) | 100 | 250 | 500 |
| Contact time (min) | 20 | 45 | 75 |
| Initial Concentration (ppm) | 1 | 10 | 50 |

TABLE 2

Design factors and limits in the CCD.

| Experiment | pH | Adsorbent Dosage | Contact time | Initial Concentration | Removal % |
|---|---|---|---|---|---|
| 1 | −1 | −1 | −1 | −1 | 42 |
| 2 | 1 | −1 | −1 | −1 | 45 |
| 3 | −1 | 1 | −1 | −1 | 39 |
| 4 | 1 | 1 | −1 | −1 | 61 |
| 5 | −1 | −1 | 1 | −1 | 43 |
| 6 | 1 | −1 | 1 | −1 | 40 |
| 7 | −1 | 1 | 1 | −1 | 40 |
| 8 | 1 | 1 | 1 | −1 | 76 |
| 9 | −1 | −1 | −1 | 1 | 43 |
| 10 | 1 | −1 | −1 | 1 | 37 |
| 11 | −1 | 1 | −1 | 1 | 37 |
| 12 | 1 | 1 | −1 | 1 | 58 |
| 13 | −1 | −1 | 1 | 1 | 41 |
| 14 | 1 | −1 | 1 | 1 | 48 |
| 15 | −1 | 1 | 1 | 1 | 34 |
| 16 | 1 | 1 | 1 | 1 | 65 |
| 17 | 0 | 0 | 0 | 0 | 95 |
| 18 | 0 | 0 | 0 | 0 | 94 |
| 19 | 0 | 0 | 0 | 0 | 96 |
| 20 | 0 | 0 | 0 | 0 | 95 |
| 21 | 0 | 0 | 0 | 0 | 97 |

Sample solutions containing 10 mg/L Rhodamine B were buffered at pH 5 using acetate buffer solutions. The adsorbent added to each buffered 10 mg/L Rhodamine B solution was agitated at 120 rpm by using a thermostatic shaker with a Selecta multimatic-55 model (Spain). This process was continued until adsorption equilibrium conditions were achieved. After each batch run, the adsorbent was recovered from the aqueous media with a neodymium magnet. The batch procedures were then carried out under different conditions: a contact time of 20 to 75 minutes, a pH of 2 to 7, an initial metal concentration of 10 to 50 mg/L, an adsorbent concentration of 1 to 20 g/L, and a temperature of 20 to 60° C. Average values were calculated after repeating each of the measurements three times. The percent adsorption of Rhodamine B was calculated according to Equation 1, as follows:

$$\text{Biosorption (\%)} = \frac{(C_i - C_f)}{C_i} \times 100, \quad \text{Eq. 1}$$

wherein $C_i$ (mg/L) is the initial Rhodamine B concentration, and $C_f$ (mg/L) is the final Rhodamine B concentrations.

Substrate Preparation & Dye Removal

Activated carbon-Fe—Ce composite material grafted with poly(trimesoyl, m-phenylenediamine) onto slides and dishes was coated, then used for removal of dye. The method of coating was in situ during the interfacial polymerization. First, the activated carbon-Fe—Ce material was dispersed in 2% w/v of m-phenylenediamine in water. Second, slides or dish were inserted in the dispersed mixture. Third, 0.10% (w/v) trimesoyl chloride in hexane (20 ml) was dropwise added into the activated carbon-Fe—Ce-m-phenylenediamine dispersion to initiate the in situ interfacial polymerization. Fourth, the system was stirred for 12 hours at 70° C. to complete the interfacial polymerization. Fifth, the slides and dishes coated with the material were taken out of the solvent and allowed to cure at 50° C. for 12 hours.

Advantages of such a method include easy removal of slides or dish from the wastewater after the adsorption of the dye, avoidance of filtration in the case of using a powder in wastewater (batch experiments), etc.

Desorption Studies

Each desorption run was carried out using a 5 mL ethanol solution to extract the sorbed Rhodamine B from the adsorbent. The adsorption-elution processes were repeated 5 times under the pre-determined equilibrium conditions.

Adsorption Capacity of Activated Carbon-Fe—Ce Magnetic Nanocomposite

There are a limited number of studies about the elimination of Rhodamine B from aqueous solutions using magnetic activated carbon-based adsorbents, some of which are presented in below in Table 3.

TABLE 3

Adsorption capacity of various adsorbents for Rhodamine B.

| Adsorbent | Adsorption capacity (mg/g) |
|---|---|
| Activated carbon from Bagasse pith | 263.9 |
| Activated carbon from waste scrap tires | 307.2 |
| Gelatin/activated carbon composite | 256.42 |
| TA-G nanocomposite | 201 |
| Magnetic MOF | 28.36 |
| Activated carbon from Sago waste | 16.12 |
| Kaolinite | 46.08 |
| Activated carbon ex lignocellulosic waste | 39.98 |
| Polyoxometalate adsorbent | 22.75 |
| Waste of seeds of *AleuritesMoluccana* | 117 |
| Indium-based MOF/GO composite | 267 |
| Mesoporous NiO nanoparticles | 111 |
| Carbon nanospheres (CNSs) | 1.95 |
| Sodium montmorillonite | 42.2 |
| Jute stick powder | 87.7 |
| Carbonaceous adsorbent | 91.1 |
| Rice husk-based porous carbons | 383.4 |
| Activated carbon (comparative) | 162.4 |
| Activated carbon-Fe$_2$O$_3$ (comparative) | 225.2 |
| Activated carbon-Fe$_2$—O$_3$—Ce$_2$O$_3$ (inventive) | 324.6 |

When compared with the literature, the synthesized magnetic activated carbon-Fe$_2$O$_3$—CeO$_2$ nanocomposite (also referred to as activated carbon-Fe—Ce herein) had a considerable adsorption capacity (324.6 mg/g) which is higher than most of the other adsorbents given in this table. This means that the exemplary inventive magnetic adsorbent can be useful materials for decontamination of water containing Rhodamine B.

Referring now to the drawings, wherein like reference numerals designate identical or corresponding parts throughout the several views.

Structural Properties of Activated Carbon-Fe—Ce Nanocomposites

Without wishing to be bound to theory, the active sites on the sorbent are believed to be receptacles for pollutant molecules during the adsorption. Fourier-transform infrared (FT-IR) spectroscopy was employed to confirm the chemical structure of the nanocomposite. FIG. 1 depicts the FT-IR spectra of the activated carbon and the activated carbon-Fe—Ce sorbents. The FT-IR spectrum of the activated carbon indicates a sharp band at about 3400 cm$^{-1}$, which may be attributed to the stretching vibration of the OH groups. The absorption band at 1110 cm$^{-1}$ may be attributed to the bending vibration of the O—H group. The band at around 1650 cm$^{-1}$ can be assigned to the stretching vibration of the C=O group, while the bands at 2924 cm$^{-1}$ and 2855 cm$^{-1}$ can be assigned to the antisymmetric and symmetric stretching vibrations of the CH$_2$ group. As depicted in the lower spectrum (b) in FIG. 1, the bands in the proximity of 470 cm$^{-1}$ and 650 cm$^{-1}$ may be assigned to the stretching vibrations of Ce—O and Fe—O, which could indicate the presence of cerium oxide (Ce$_2$O$_3$) and iron oxide (Fe$_2$O$_3$) on the carbon structure.

Figure 2A:
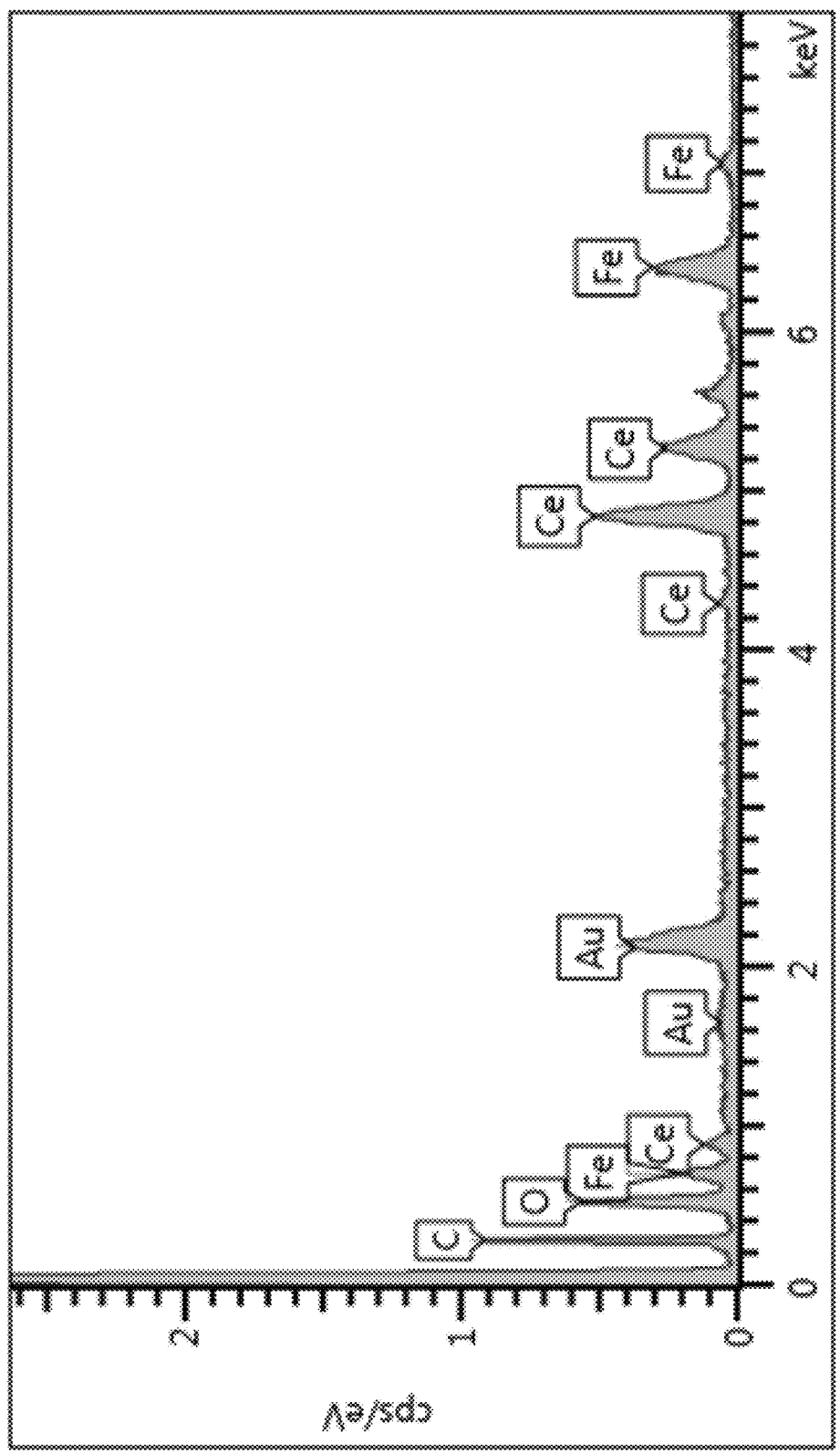
FIG. 2A shows an energy-dispersive x-ray (EDX) spectrum of the exemplary activated carbon modified with iron oxide and cerium oxide.
Figure 2B:
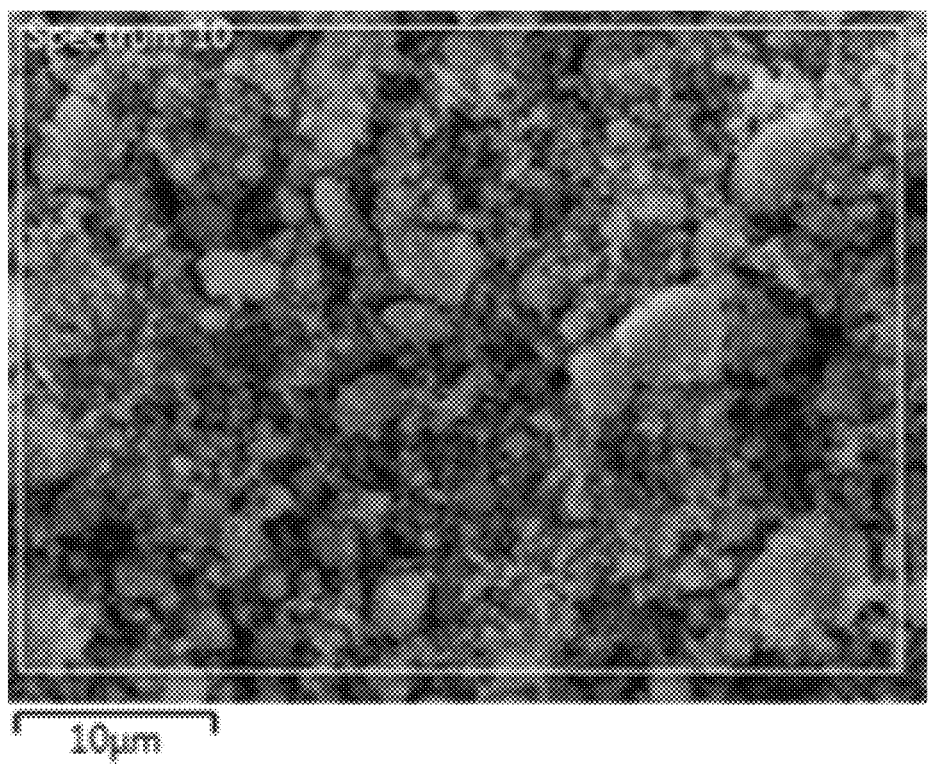
FIG. 2B shows a scanning electron microscopy (SEM) image of the exemplary activated carbon modified with iron oxide and cerium oxide at 10 m magnification.
Figure 2C:
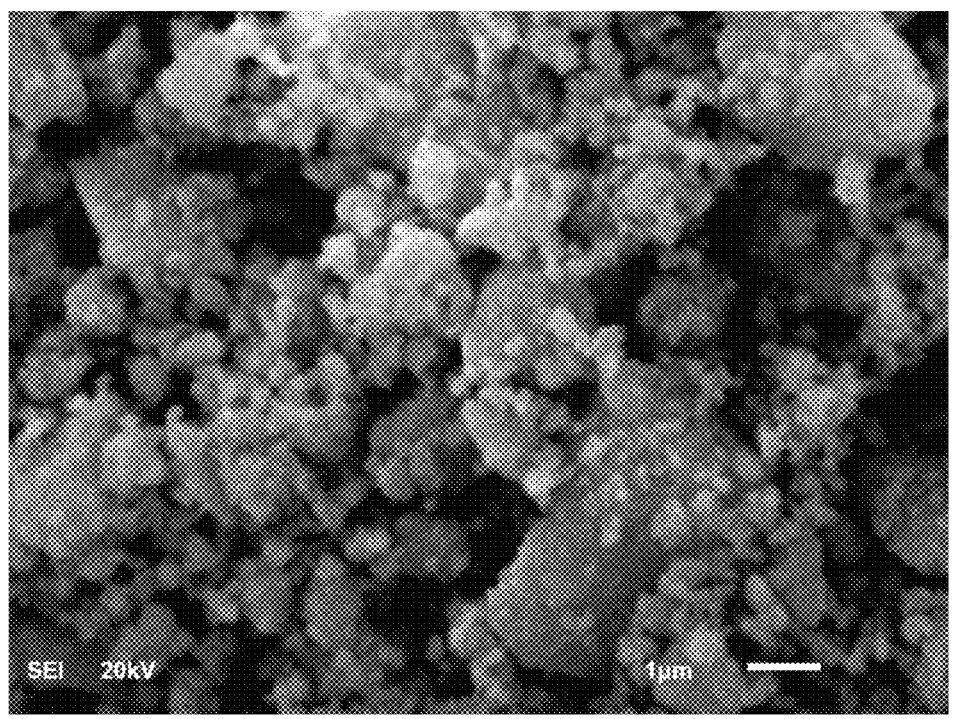
FIG. 2C shows an SEM image of the exemplary activated carbon modified with iron oxide and cerium oxide at 1 m magnification.
Figure 2D:
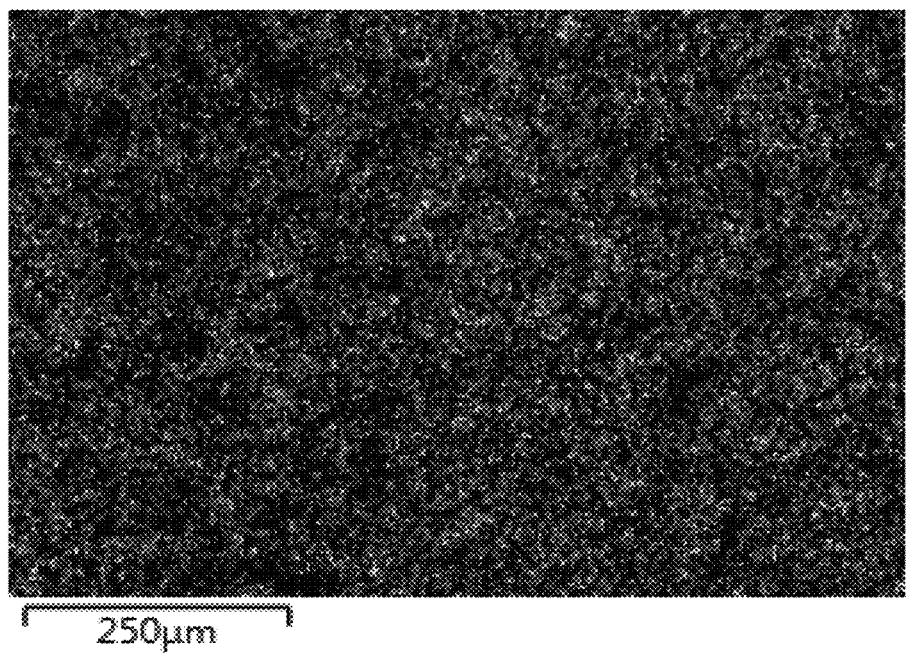
FIG. 2D shows an elemental mapping image of Fe on the surface of the exemplary activated carbon modified with iron oxide and cerium oxide.
Figure 2E:
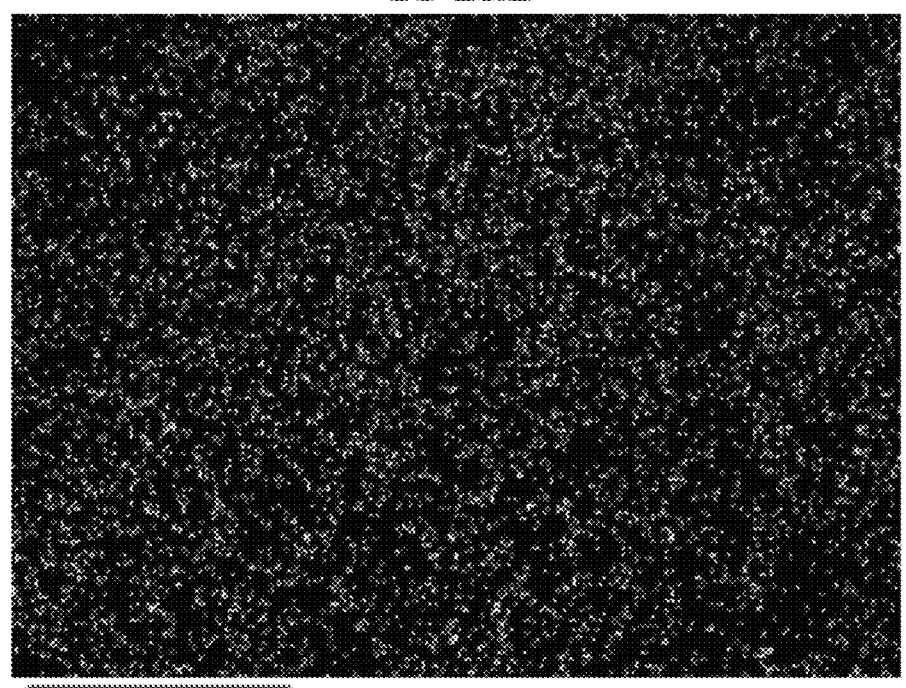
FIG. 2E shows an elemental mapping image of Ce on the surface of the exemplary activated carbon modified with iron oxide and cerium oxide.

FIG. 2A depicts an energy-dispersive x-ray (EDX) spectrum with elemental analysis, FIG. 2B and FIG. 2C show scanning electron microscopy (SEM) images. FIG. 2D and FIG. 2E respectively show elemental mapping of Fe and Ce on the prepared nanocomposite. The EDX spectrum of the exemplary nanocomposite in FIG. 2A indicates the presence of carbon, oxygen, iron, and cerium. Table 4 depicts the elemental analysis of the nanocomposite, indicating the weight percentage (wt. %) of these elements forming the prepared sample.

TABLE 4

Elemental analysis of the nanocomposite obtained from EDX analysis

| Element | Line Type | Apparent Concentration | k Ratio | Wt. % | Wt. % Sigma |
|---|---|---|---|---|---|
| C | K series | 69.4 | 0.69375 | 68.86 | 0.49 |
| O | K series | 14.3 | 0.04799 | 11.7 | 0.83 |
| Fe | K series | 11.6 | 0.11569 | 10.6 | 0.78 |
| Ce | L series | 11.1 | 0.28917 | 8.9 | 0.96 |
| Total | | | | 100.00 | |

The morphology of the nanocomposite was examined by SEM imaging, as shown in FIGS. 2B and 2C. The SEM images indicate the presence of the nanoparticles on the carbon. The SEM image in FIG. 2C also indicates that the sample has a uniform morphology. The distribution of the component elements, Fe and Ce, is illustrated by the mapping in FIGS. 2D (iron) and 2E (cerium). The iron and cerium elemental mapping indicates a good distribution of the nanoparticles on the activated carbon surface.

Textural Properties of Activated Carbon-Fe—Ce Nanocomposites

In addition to the active sites on the adsorbent, the surface properties, including the surface area and pores, can affect the efficiency of the adsorbent. The textural properties of the exemplary inventive activated carbon-Fe—Ce nanocomposites sorbent were determined from an N$_2$ adsorption-desorption isotherm obtained using a surface area analyzer. A type 11 isotherm with a contribution of both micro and mesopores was observed. The textural parameters obtained from the analysis of the N$_2$ physisorption isotherm are summarized in Table 5, below.

TABLE 5

Properties of AC and AC/Fe/Ce obtained from nitrogen physisorption.

| Textural Parameters | Activate Carbon | AC/Fe/Ce |
|---|---|---|
| BET surface area ($S_{BET}$) | 469 m$^2$/g | 423 m$^2$/g |
| Micropore surface area ($S_{micro}$) | 242 m$^2$/g | 359 m$^2$/g |
| Horvath-Kawazoe Maximum pore volume at p/p° = 0.993 | 0.765 m$^2$/g | 0.651 m$^2$/g |
| Median pore width | 240 Å | 95 Å |
| BJH average pore width (4 V/A) | 11.5 nm | 11.6 nm |
| t-plot external surface area | 227 m$^2$/g | 285 m$^2$/g |

The BET surface area of the activated carbon-Fe—Ce material was found to be 423 m$^2$/g, while the Horvath-Kawazoe maximum pore volume was found to be 0.65 cm$^3$/g. Compared with the activated carbon, the textural parameters of the activated carbon-Fe—Ce nanocomposite are different, as shown in Table 5. This may be due to the nanoparticles after loading changing the textural properties of the activated carbon.

Factorial Design Optimization

Figure 3A:
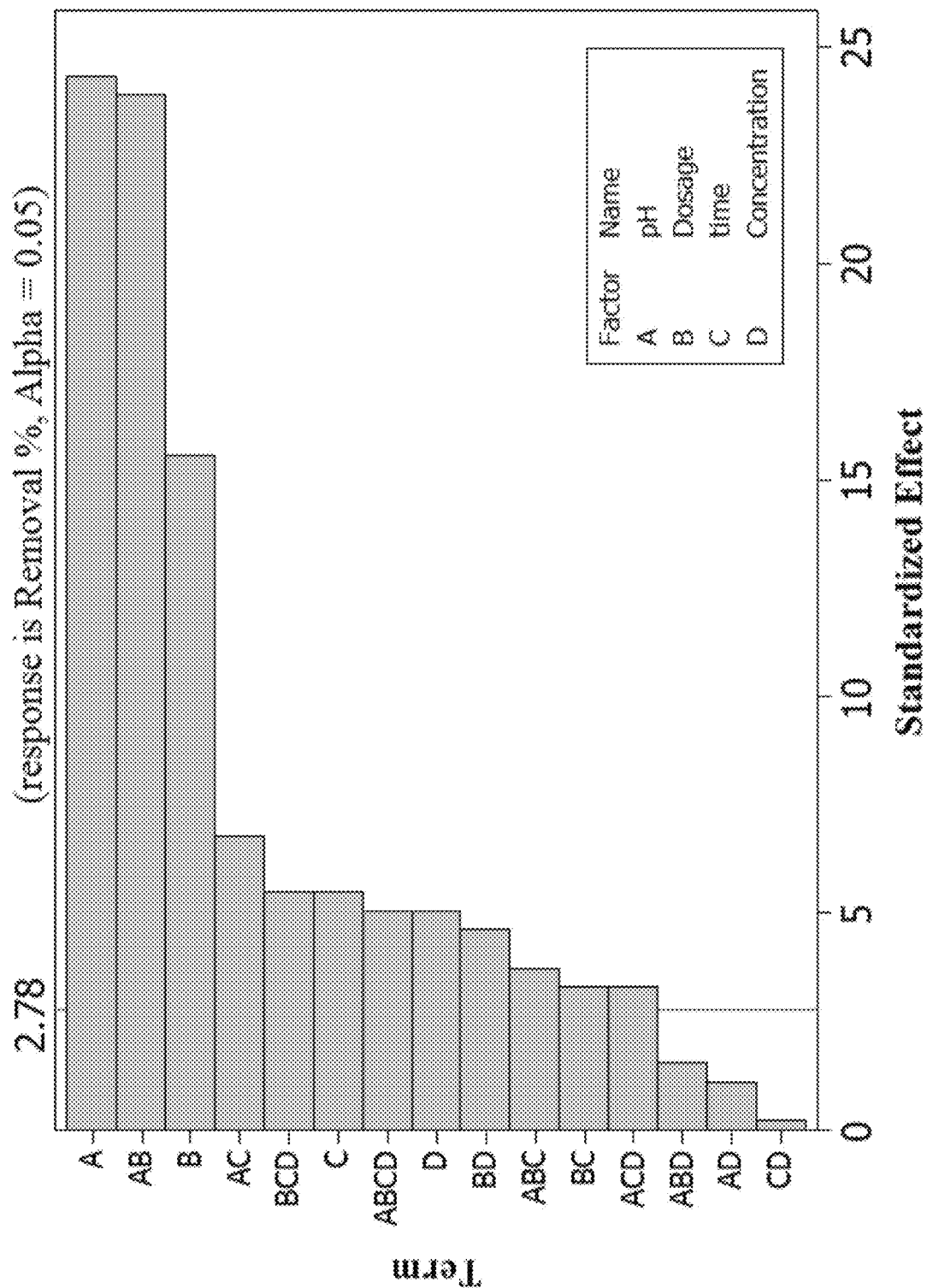
FIG. 3A shows half-normal plot of the effects from data obtained by factorial design for the exemplary activated carbon modified with iron oxide and cerium oxide.
Figure 3B:
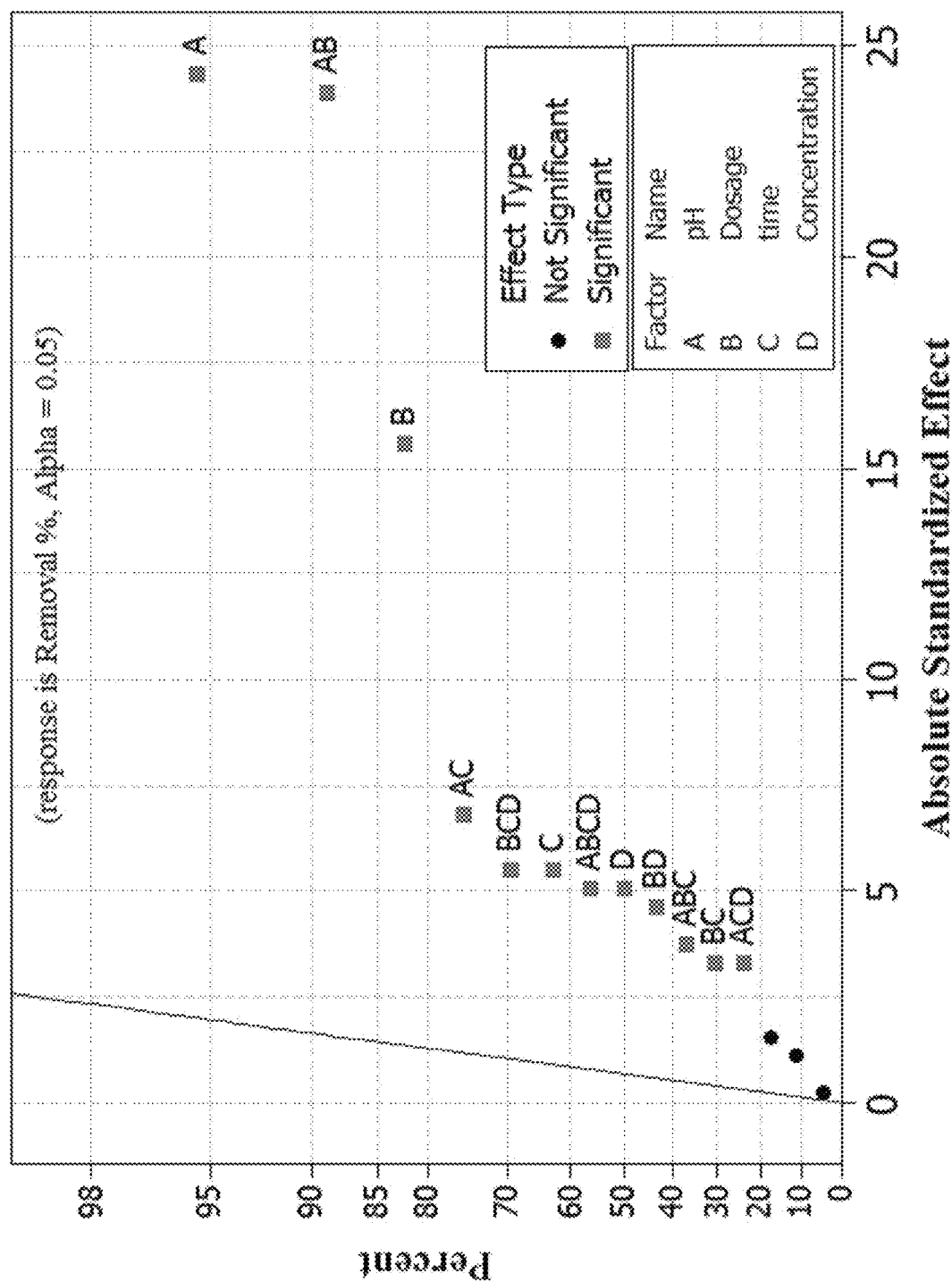
FIG. 3B shows a Pareto chart of data obtained by factorial design of the exemplary activated carbon modified with iron oxide and cerium oxide.

The factorial design can assist in identifying useful adsorption batch parameters, such as pH, adsorbent dosage, the initial concentration of the dyestuff, and the contact time. After conducting the designed experiments as discussed above, the removal percentage was used to obtain the factorial design data in a Pareto chart and the normal plots of the effects are depicted in FIGS. 3A and 3B. The Pareto chart in FIG. 3B indicates that the most significant factors affecting the adsorption of dye on the exemplary inventive adsorbent are the pH and the pH/dosage interactions. The half-normal plot of the effects indicates that the pH has a positive effect, meaning by the increase in the pH that there was a significant increase in the adsorption of the dye.

Figure 4:
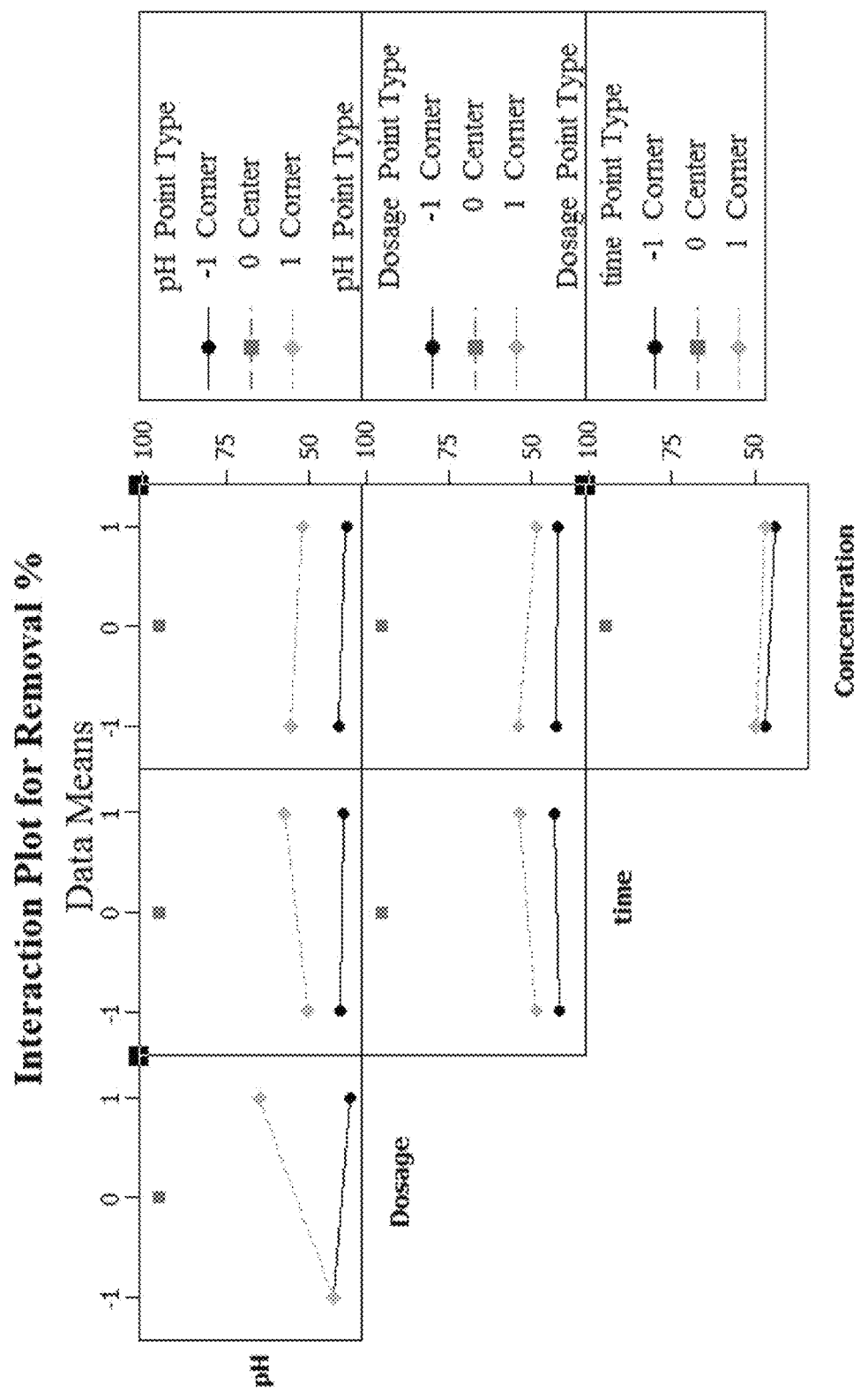
FIG. 4 shows factorial design showing the interaction plot for a response for the exemplary activated carbon modified with iron oxide and cerium oxide.

FIG. 4 indicates interaction plots corresponding to the interactions between the experimental factors, pH, adsorbent dosage and contact time. As shown from these plots, the contact time has the highest effect on the adsorption of the Rhodamine B.

Reusability of Activated Carbon-Fe—Ce Nanocomposites

Figure 5:
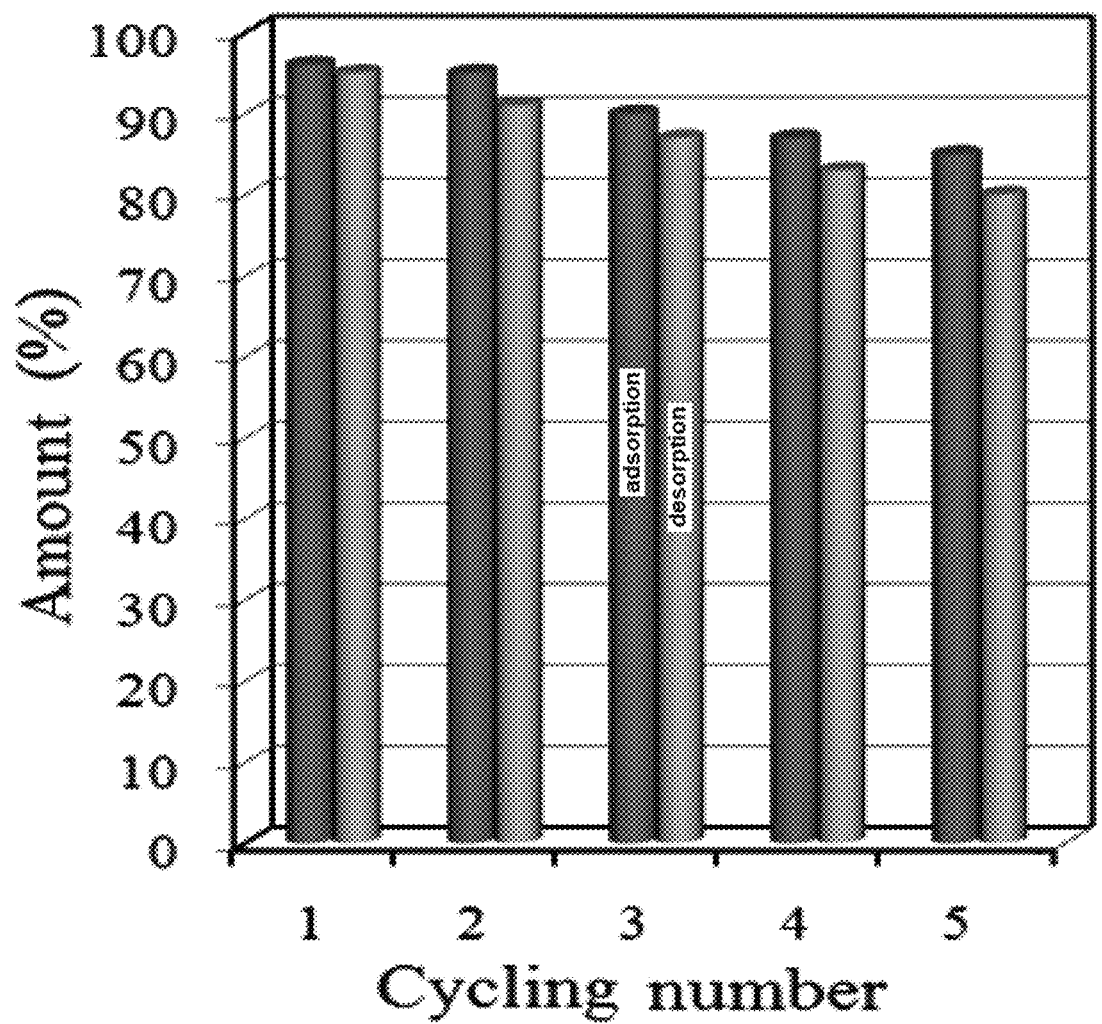
FIG. 5 shows reusability performance during the adsorption/desorption processes with respect to the thermal cycling for the exemplary activated carbon modified with iron oxide and cerium oxide.

FIG. 5 shows the results of testing for the reusability of exemplary inventive materials. Reusability performance, or cycling sorption/desorption efficiency, is one of the factors worth considering in the preference of newly developed adsorbents for large-scale operations. The reusability performance of the exemplary activated carbon-Fe—Ce nanocomposites in the removal of Rhodamine B from aqueous solutions was tested relative to the number of cycles. As shown in FIG. 5 from the column graphs, using 5 mL of ethanol as an eluent resulted in an adsorption of Rhodamine B of 80% from the magnetic material, even though it was subjected to seven treatment cycles. Similarly, the magnetic adsorbent removed 75% of the Rhodamine B from aqueous solutions. The columns in FIG. 5 represent the amount %. However, after 5 cycles, the adsorption and desorption performance of the adsorbent decreased to 85% for ethanol and 78% for water. These results showed that the exemplary activated carbon-Fe—Ce nanocomposites had a good reusability performance without a remarkable reduction in adsorption/desorption capacity after 5 cycles. Thus, inventive adsorbents can be relevant for removing Rhodamine B from waste water on household, industrial, and/or municipal remediation systems.

Figure 6A:
FIG. 6A shows exemplary ceramic slides coated with inventive polyamide-grafted activated carbon-Fe—Ce nanocomposite using poly(trimesoyl, m-phenylenediamine)
Figure 6B:
FIG. 6B shows exemplary glass dish coated with inventive polyamide-grafted activated carbon-Fe—Ce nanocomposite using poly(trimesoyl, m-phenylenediamine)
Figure 7:
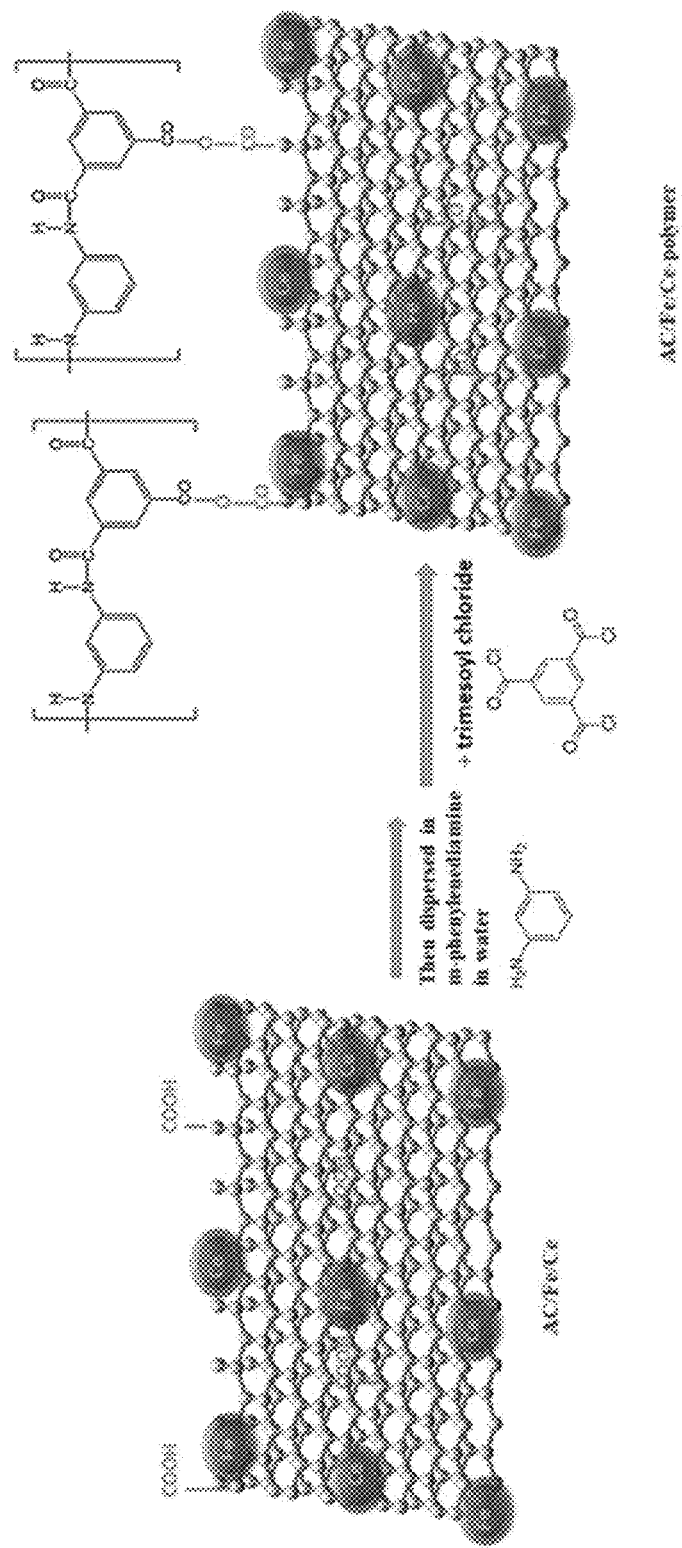
FIG. 7 shows a pictorial representation of the synthesis of exemplary polyamide-grafted activated carbon-Fe—Ce nanocomposite using poly(trimesoyl, m-phenylenediamine)
Figure 8A:
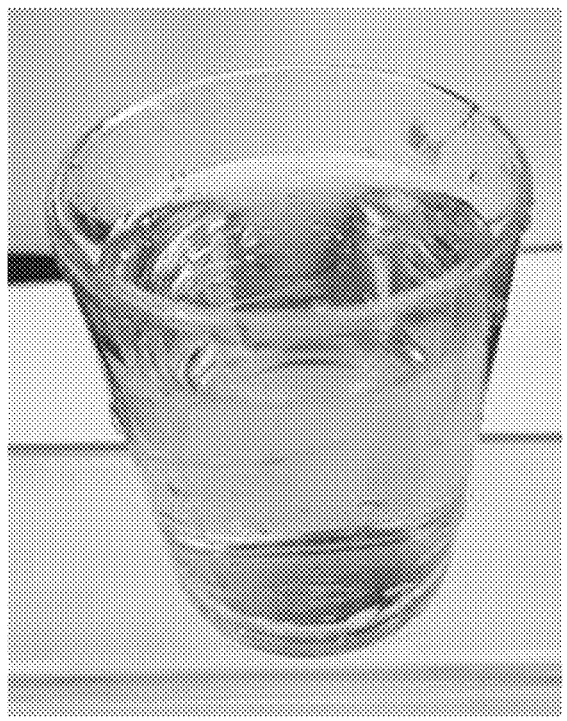
FIG. 8A shows a methylene blue solution.
Figure 8B:
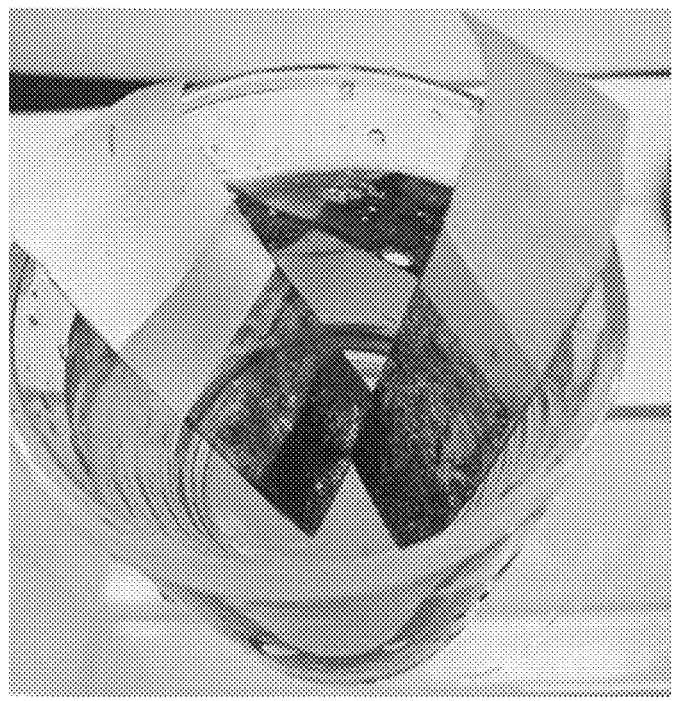
FIG. 8B shows exemplary glass slides coated with exemplary polyamide-grafted activated carbon-Fe—Ce nanocomposite inserted into the methylene blue dye solution.
Figure 8C:
FIG. 8C shows the solution after 30 minutes of contact with the glass slides coated with exemplary polyamide-grafted activated carbon-Fe—Ce nanocomposite.
Figure 8D:
FIG. 8D shows the solution after removal of the slides and completion of the dye removal tests using slides coated with exemplary poly(trimesoyl, m-phenylenediamine) polyamide-grafted activated carbon-Fe—Ce nanocomposite.

FIG. 6A to 6B provide photographs of exemplary slides and dish coated with activated carbon-Fe—Ce nanocomposites grafted with poly(trimesoyl, m-phenylenediamine). The method of in situ coating by interfacial polymerization may involve, for example: (i) dispersing activated carbon-Fe—Ce nanocomposite in 2% (w/v) of m-phenylenediamine in water; (ii) inserting/contacting the slides or dishes in/with the dispersed mixture; (iii) adding 0.10% (w/v) trimesoyl chloride in hexane drop-wise into the activated carbon-Fe—Ce nanocomposite/m-phenylenediamine dispersion to initiate an in situ interfacial polymerization; (iv) stirring the system for 12 hours (e.g., at least 3, 4, 5, 6, 7, 8, 9, or 10 hours and/or up to 48, 36, 24, 20, 18, 16, 14, 12, 11, or 10 hours) at 70° C. (depending upon the solvent, e.g., at least 40, 45, 50, 55, 60, or 65° C. and/or up to 100, 95, 90, 85, 80, 75, 70° C.) to attain the completeness of interfacial polymerization; and (v) removing (from the solution) and curing the coated slides/dishes at 50° C. (e.g., at least 40, 42.5, 45, 47.5, 50, 52.5, 55, 57.5, 60, 65, 70, 75, 80, or 85° C. and/or up to 120, 110, 100, 90, 80, 70, or 60° C.) for 12 hours (e.g., at least 3, 4, 5, 6, 7, 8, 9, or 10 hours and/or up to 48, 36, 24, 20, 18, 16, 14, 12, 11, or 10 hours). This process was repeated and performed on different glasses/slides and glass dishes, as may be applied to the surfaces of other materials, such as ceramics, plastics, etc. The exemplary inventive materials were evaluated for the removal of methylene blue from water.

Evaluation of Methylene Blue Dye Removal

The adsorption efficiency of the exemplary inventive materials was tested as indicated in FIG. 8A to 8D. The coated slides were inserted inside the dye solution. FIG. 8A to 8D depict the slides coated with activated carbon-Fe—Ce nanocomposites grafted upon poly(trimesoyl, m-phenylenediamine) that are inserted into the dye solution. The adsorption was monitored and the concentration of the dye was analyzed. The experiments were conducted in duplicate and the average was reported. The samples were analyzed using a UV-vis spectrophotometer to quantify the amount of the dye. The range of the spectrophotometer was chosen from 500 to 700 nm, and the reading of the absorbance was at 665 nm.

Figure 9:
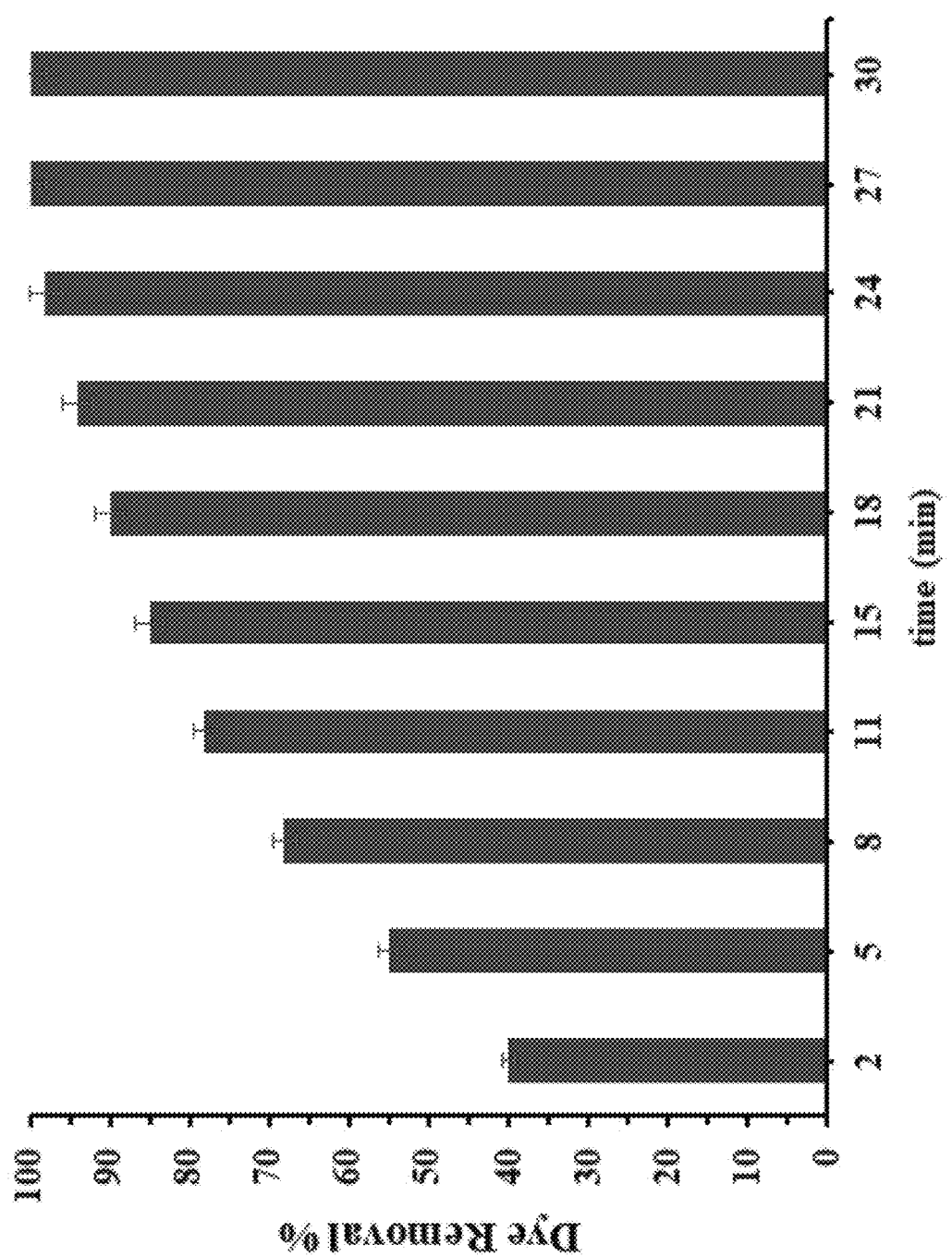
FIG. 9 shows a chart reflecting the influence of the contact time on the percent removal of the dye over exemplary poly(trimesoyl, m-phenylenediamine) polyamide-grafted activated carbon-Fe—Ce nanocomposite.

FIG. 9 shows the influence of the contact time on the percent removal of the dye over activated carbon-Fe—Ce nanocomposites grafted with poly(trimesoyl, m-phenylenediamine).

Figure 10A:
FIG. 10A shows a 4-L beaker with water containing methylene blue dye.
Figure 10B:
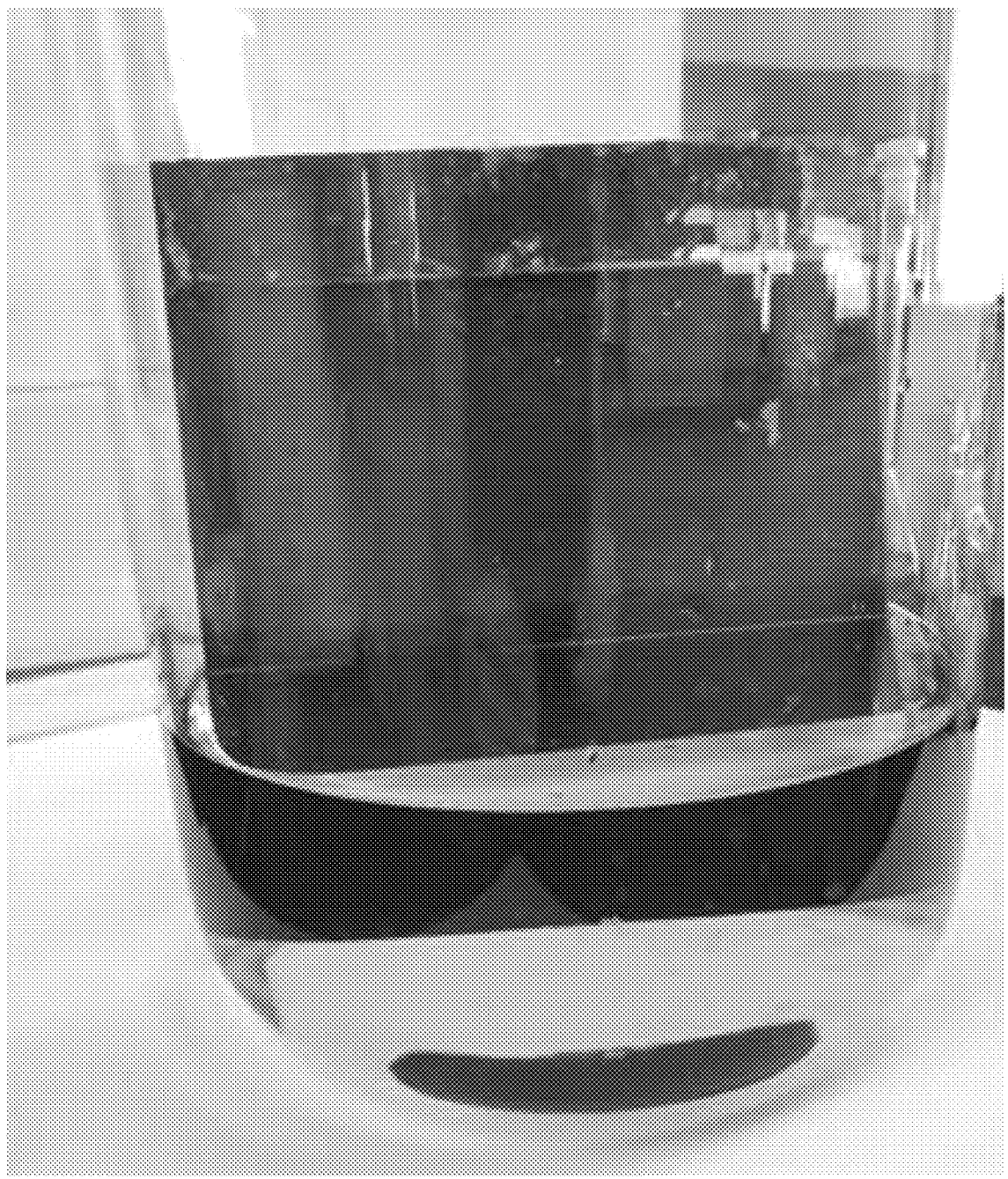
FIG. 10B shows the insertion of a ceramic slide coated with exemplary poly(trimesoyl, m-phenylenediamine) polyamide-grafted activated carbon-Fe—Ce nanocomposite into the aqueous methylene blue solution.
Figure 10C:
FIG. 10C shows the aqueous solution from FIG. 10B after 30 minutes of contact with the ceramic slides coated with AC/Fe/Ce-polymer illustrating a dye removal test using a larger slide coated with exemplary poly(trimesoyl, m-phenylenediamine) polyamide-grafted activated carbon-Fe—Ce nanocomposite.

FIG. 10A to 10C show the use of a larger scale slide coated with the activated carbon-Fe—Ce nanocomposites grafted onto polymer. Large slide tests were also performed using 3 liters of dye solution. It can be seen from FIG. 10A to 10C that after complete removal of dye, a colorless solution was obtained.

Test Using Dish Coated with the Material

Figure 11:
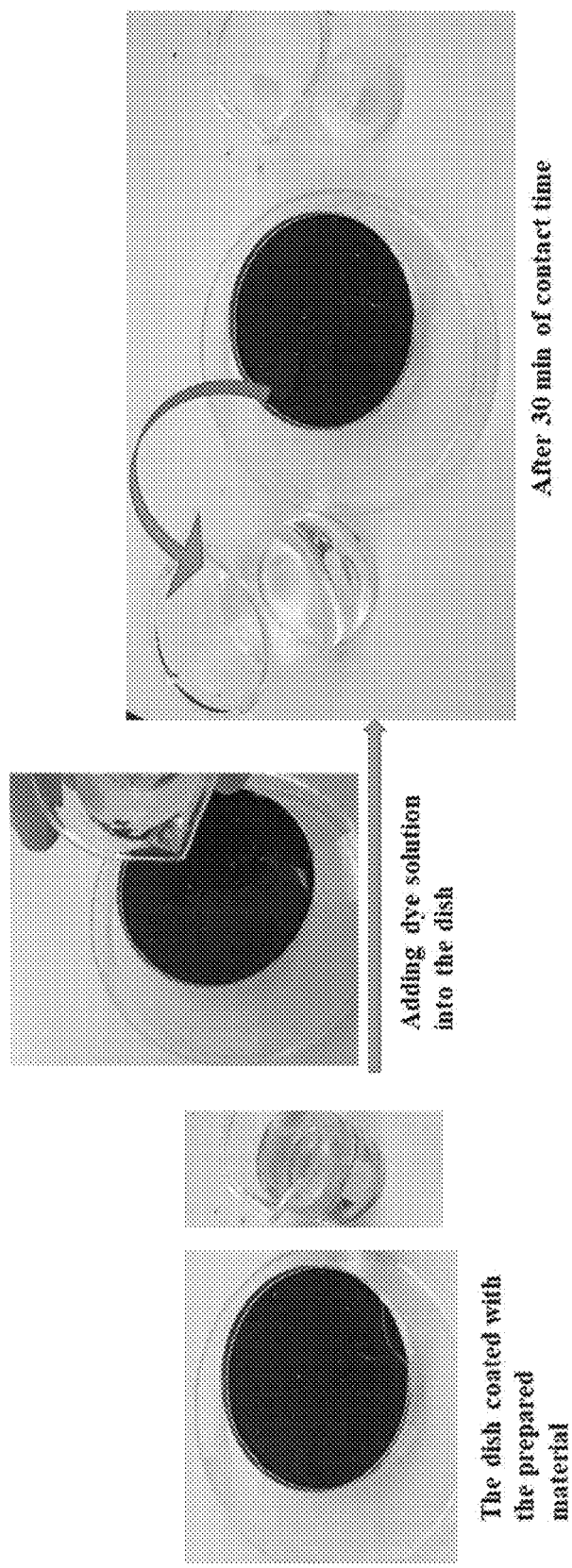
FIG. 11 shows a photographic representation of the dye removal test using dish coated with exemplary poly(trimesoyl, m-phenylenediamine) polyamide-grafted activated carbon-Fe—Ce nanocomposite.

Tests were also performed using dish coated with exemplary inventive activated carbon-Fe—Ce nanocomposites grafted with poly(trimesoyl, m-phenylenediamine). It can be seen from FIG. 11 that after complete removal of dye was obtained.

Recycling Performance of the Synthesized Ac/Fe/Ce Grafted with Poly(Trimesoyl, M-Phenylenediamine)

Figure 12:
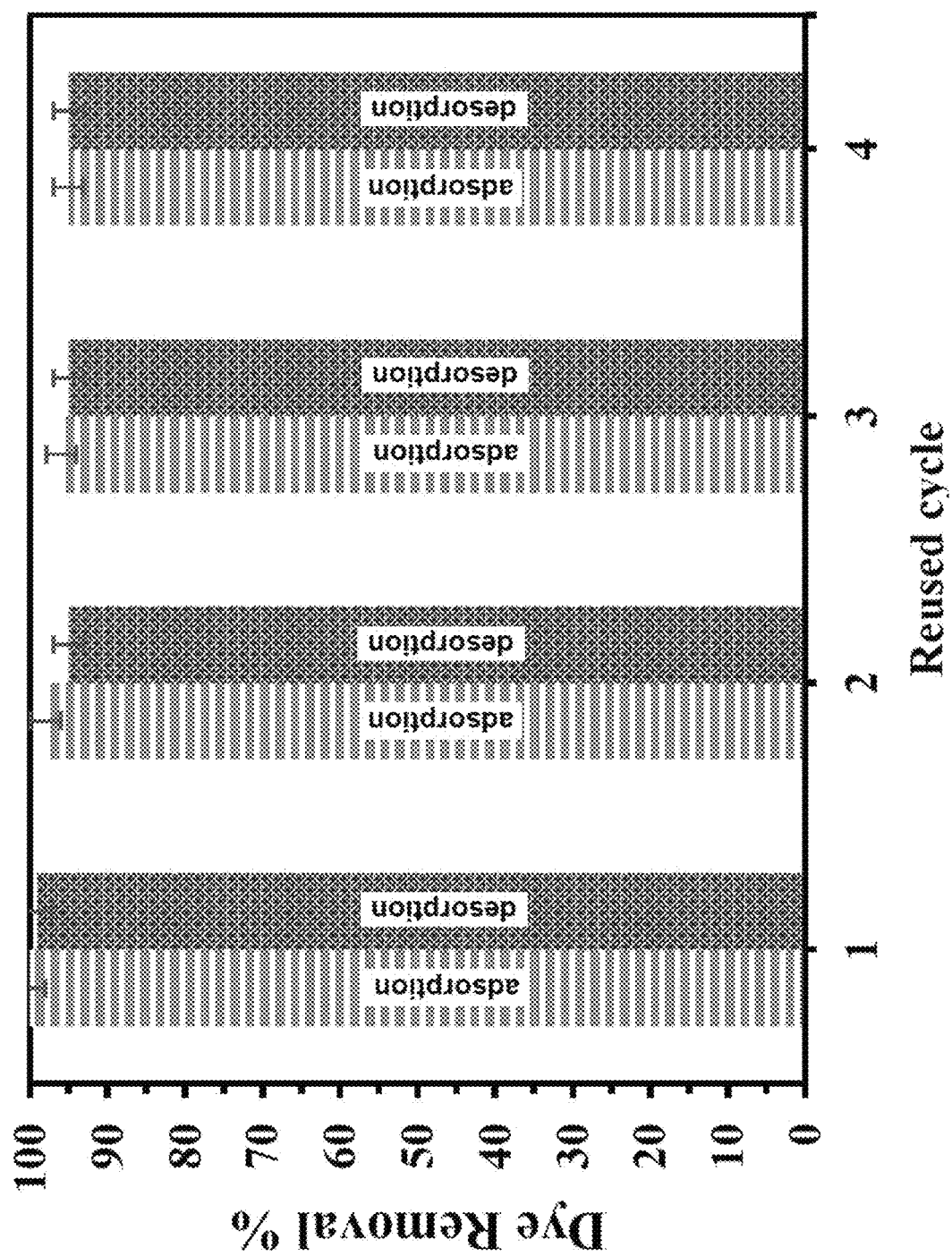
FIG. 12 shows a chart illustrating the reuse/recycling performance of exemplary poly(trimesoyl, m-phenylenediamine) polyamide-grafted activated carbon-Fe—Ce nanocomposite for the adsorption/desorption of dye.

The disposal of the used adsorbent can cause considerable environmental trouble because of the volumes of discharged toxic pollutant. Replacing used materials with new adsorbents after each adsorption cycle is generally non-economical. Therefore, the reuse or recycling of adsorbents is a relevant factor in development. A method of evaluating the reuse capacity of materials may include following adsorption/desorption cycles. Such adsorption/desorption analysis was conducted for the exemplary inventive activated carbon-Fe—Ce nanocomposites grafted with poly(trimesoyl, m-phenylenediamine) sorbent. FIG. 12 indicates regeneration rates of the exemplary sorbent materials over seven cycles, though only four cycles are shown. As evident the results, the adsorption and desorption yields were still over 80% up to the first four cycles. After the seventh cycle, the sorption efficacies were 62% for adsorption and 54% for desorption. The exemplary inventive activated carbon-Fe—Ce nanocomposite grafted with poly(trimesoyl, m-phenylenediamine) show acceptable recycling or reuse performance for the removal of dye from aqueous solution.

Numerous modifications and variations of the present invention are possible in light of the above teachings. It is therefore to be understood that within the scope of the appended claims, the invention may be practiced otherwise than as specifically described herein.

The invention claimed is:

1. A method of preparing a polyamide-supported activated carbon nanocomposite modified with iron oxide and cerium oxide, the method comprising:
    suspending activated carbon in a solution comprising iron ions at pH in a range of from 7.0 to 10, to obtain a suspension;
    stirring and heating the suspension to form an activated carbon-iron oxide composite;
    combining cerium ions with the activated carbon-iron oxide composite in a liquid to form a reaction mixture at a pH in a range of from 7.0 to 10.0;
    precipitating the activated carbon, iron oxide, cerium oxide by heating the reaction mixture to form an unsupported nanocomposite comprising, bound together, the activated carbon, iron oxide, and cerium oxide;
    forming and reacting a monomer dispersion comprising the unsupported nanocomposite, an aromatic diamine and/or triamine, and an aromatic tricarboxylate and/or dicarboxylate, thereby forming a polymeric solid comprising a polyamide comprising, in reacted form, the aromatic diamine and the reactive aromatic tricarboxylate, bound to the unsupported nanocomposite.

2. The method of claim 1, wherein the unsupported nanocomposite comprises:
    carbon in a range of from 66 to 72 wt. %;
    iron in a range of from 10 to 15 wt. %;
    cerium in a range of from 7 to 14 wt. %; and
    oxygen in a range of from 8 to 18 wt. %.

3. The method of claim 1, wherein the stirring and heating is carried out:
    at a temperature in a range of from 60 to 100° C.; and
    for a time in a range of from 2 to 10 hours,
    to form the activated carbon-iron oxide composite.

4. The method of claim 1, wherein the iron ions in the suspending are in the form of a salt or complex comprising nitrate, fluoride, chloride, bromide, iodide, formate, oxalate, citrate, perchlorate, tetrafluoroborate, sulfate, fluorosilicate, iodate, or a combination of two or more of any of these.

5. The method of claim 1, wherein the iron ions comprise at least 75 wt. % Fe(III).

6. The method of claim 1, wherein the solution comprising the iron ions and/or the liquid comprising the cerium ions comprise a liquid alcohol;
a liquid diol; and
water.

7. The method of claim 1, wherein the liquid in the suspending comprises, based on volume:
30 to 50% ethanol;
2.5 to 10.5% ethylene glycol; and
35 to 66.5% water.

8. The method of claim 1, wherein the cerium ions in the combining are in the form of a salt or complex comprising nitrate, fluoride, chloride, bromide, iodide, selenate, formate, oxalate, citrate, perchlorate, tetrafluoroborate, sulfate, fluorosilicate, iodate, or a combination of two or more of any of these.

9. The method of claim 1, wherein the precipitating comprises
heating at a temperature in a range of from 70 to 110° C., for a time in a range of from 3 to 8 hours.

10. The method of claim 1, wherein the forming and reacting comprises
heating to a temperature in a range of from 50 to 100° C., for a time in a range of from 1 to 24 hours.

11. The method of claim 1, wherein the aromatic diamine and/or triamine has a general structure

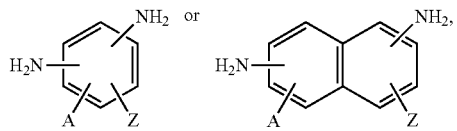

wherein A and Z are independently selected from H, F, Cl, $CH_3$, $CH_2CH_3$, OH, or $OCH_3$, and
wherein the amines are spaced by 1, 2, 3, 4, or 5 aromatic ring carbons.

12. The method of claim 1, wherein the aromatic diamine and/or triamine comprises at least 75 wt. % m-phenylenediamine, relative to total amine weight.

13. The method of claim 1, wherein the aromatic tricarboxylate and/or dicarboxylate has a general structure

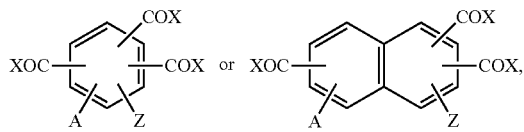

wherein A and Z are independently selected from H, F, Cl, $CH_3$, $CH_2CH_3$, OH, or $OCH_3$,
wherein X is independently OH, Cl, Br, or forms an anhydride, and
wherein the carboxylates are spaced by 1, 2, 3, 4, or 5 aromatic ring carbons.

14. The method of claim 1, wherein the aromatic tricarboxylate and/or dicarboxylate comprises at least 75 wt. % trimesoyl chloride.

15. The method of claim 1, wherein the polymeric solid is formed upon a glass or ceramic surface.

16. The method of claim 1, wherein the unsupported nanocomposite has
a BET surface area in a range of from 385 to 465 $m^2/g$,
a micropore surface area in a range of from 250 to 425 $m^2/g$,
a Horvath-Kawazoe maximum pore volume in a range of from 0.55 to 0.75 $cm^3/g$,
a median pore width in a range of from 50 to 150 Å,
a BJH average pore width in a range of from 10 to 13 nm, and/or
a t-plot external surface area in a range of from 235 to 335 $m^2/g$.

17. A composition, comprising:
a polyamide;
a nanocomposite comprising, bound together, activated porous carbon, iron oxide, and cerium oxide, the nanocomposite having an elemental composition of carbon in the range of 66 to 72 wt. %, iron in the range of 10 to 15 wt. %, cerium in the range of 7 to 14 wt. %, and oxygen in the range 8 to 18 wt. %,
wherein the polyamide is bonded to the nanocomposite, and
wherein the nanocomposite has adsorption capacity in a range of from 300 to 600 mg/g.

18. The composition of claim 17, having a BET surface area in a range of from 350 to 550 $m^2/g$, a micropore surface area in a range of from 300 to 400 $m^2/g$ volume, and a pore volume in a range of from 0.4 to 1.0 $cm^3/g$.

19. The composition of claim 17, wherein the polyamide comprises, in polymerized form:
an aromatic diamine with a general structure

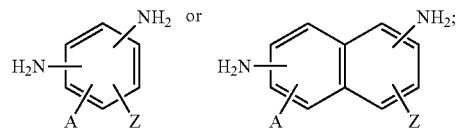

and
an aromatic tricarboxylate with a general structure

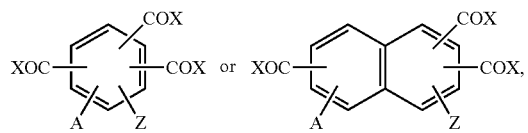

wherein A and Z are independently selected from H, F, Cl, $CH_3$, $CH_2CH_3$, OH, or $OCH_3$,
wherein X is independently OH, Cl, Br, or forms an anhydride, and
wherein the amines and carboxylates are independently spaced by 1, 2, 3, 4 or 5 aromatic ring carbons.

20. A method of removing a dye from water, the method comprising:
contacting water comprising a dye with the composition of claim 17; and
separating the water and the composition, thereby removing the dye with the composition.

* * * * *